(12) United States Patent
Ozeki et al.

(10) Patent No.: US 6,881,333 B2
(45) Date of Patent: Apr. 19, 2005

(54) WATER PURIFIER FILTRATION PORTION, WATER PURIFIER MAIN BODY, AND WATER PURIFIER INCLUDING THE BOTH

(75) Inventors: Tetsuo Ozeki, Hirakata (JP); Hiroto Yuasa, Hirakata (JP); Kazuaki Otsuki, Hirakata (JP)

(73) Assignee: Osaka Gas Chemicals Co., Ltd., Osaka (JP)

( * ) Notice: Subject to any disclaimer, the term of this patent is extended or adjusted under 35 U.S.C. 154(b) by 110 days.

(21) Appl. No.: 10/098,511

(22) Filed: Mar. 18, 2002

(65) Prior Publication Data

US 2002/0134714 A1 Sep. 26, 2002

(30) Foreign Application Priority Data

Mar. 26, 2001 (JP) ........................................ 2001-086939
Mar. 26, 2001 (JP) ........................................ 2001-086947

(51) Int. Cl.[7] .............................................. B01D 35/02
(52) U.S. Cl. ........................ 210/232; 210/420; 210/435; 210/463; 285/307
(58) Field of Search ................................ 210/418–420, 210/424, 460, 463, 232, 435; 285/305, 307, 314, 330

(56) References Cited

U.S. PATENT DOCUMENTS

| 4,623,451 A | 11/1986 | Oliver ........................ 210/87 |
| 4,686,037 A | 8/1987 | Lang ....................... 210/221.2 |
| 5,017,286 A * | 5/1991 | Heiligman ................. 210/266 |
| 5,527,451 A | 6/1996 | Hembree et al. ............. 210/88 |
| 5,653,868 A | 8/1997 | Yanou et al. ............... 210/232 |
| RE35,667 E | 11/1997 | Heiligman .................. 210/266 |
| 5,888,381 A | 3/1999 | Primdahl et al. ............. 210/87 |
| 5,928,504 A | 7/1999 | Hembre et al. .............. 210/88 |
| 5,935,426 A | 8/1999 | Giordano et al. ............ 210/87 |

FOREIGN PATENT DOCUMENTS

| JP | 07-116656 | 5/1995 |
| JP | 11-128911 | 5/1999 |

* cited by examiner

Primary Examiner—Matthew O. Savage
(74) Attorney, Agent, or Firm—Armstrong, Kratz, Quintos, Hanson & Brooks, LLP

(57) ABSTRACT

A water purifier is composed of a valve main body and a filtration portion, which are coupled to each other in an attachable and detachable manner at the main body side coupling portion and the filtration portion side coupling portion. Consequently, the water purifier filtration portion can be connected to the water purifier main body in a single step with ease in a secure manner, and at the same time, the water purifier filtration portion will not fall off easily even when water with a high water pressure flows in. Also, the water purifier is provided with a concave portion and a sensor packing formed as an integral portion of the concave portion and protruding toward an indicator portion on a wall surface of a cartridge. The indicator portion is provided with a conductive member at a position where it is brought into contact with a first input portion by a water pressure and thereby closes an electric circuit on a circuit board. Consequently, the service life (the rated service cycle) of a filter material (medium) can be notified to the user accurately, and a fluid-tight condition of the indicator portion and the cartridge portion can be ensured.

11 Claims, 19 Drawing Sheets

WATER PURIFIER FILTRATION PORTION, WATER PURIFIER MAIN BODY, AND WATER PURIFIER INCLUDING THE BOTH

FIELD OF THE INVENTION

The present invention relates to a water purifier filtration portion, a water purifier main body, and a water purifier including these components employed in or as a water purifier for home or commercial use. More specifically, the present invention relates to a water purifier filtration portion that is easy to attach to and detach from a water purifier main body and is also easy to replace, a water purifier main body, and a water purifier including these components. The present invention also relates to a water purifier filtration portion equipped with a display (indicator) portion for indicating when a filtration material needs replacing, and a water purifier including the same.

BACKGROUND OF THE INVENTION

Conventionally, a typical water purifier mounted to a tap water faucet for home or commercial use is composed of a water purifier main body having a raw water inlet and a raw water outlet, and a filtration portion for holding a filtration material that purifies raw water by filtration. The most popular type of water purifier in recent years can maintain filtration performance at or above a predetermined level while saving a space by employing a compact filtration portion holding a small quantity of the filtration material that is replaced each time it has been used for filtration of a predetermined volume of water.

The water purifier having the above-described structure needs a mechanism that enables a user to attach the filtration portion to the water purifier main body easily in a secure manner so as not to cause a water leak or the like. In other words, in the case of a water purifier for home use, in particular, the user prefers a water purifier with a time-and-labor saving structure that makes the water purifier easy to attach for anyone by omitting a burdensome step, such as referring to the manual in each replacement.

Water purifiers disclosed in Japanese Laid-open Patent Application No. 116656/1995 (Tokukaihei No. 7-116656) and Japanese Laid-open Patent Application No. 128911/1999 (Tokukaihei No. 11-128911) are known as examples of the water purifier equipped with the compact filtration portion.

FIG. 12 is a view schematically showing a structure of a water purifier 60 disclosed in the above-cited publications. As shown in the drawing, the water purifier 60 disclosed in the above-cited publications is provided with a bayonet mechanism 63 at a connection portion of a water purifier main body 61 and a filtration portion 62.

The following description will describe more in detail the conventionally used bayonet mechanism 63. As shown in FIG. 12, the bayonet mechanism 63 is chiefly composed of a cylindrical concave portion 65 provided to a raw water outlet 64 formed at the side portion of the water purifier main body 61, and a convex portion 66 provided to the filtration portion 62 so as to correspond with the concave portion 65.

The concave portion 65 is provided with a pair of notch portions 67 and a pair of concave portion side overhang portions 68 extending in the circumference direction on the inner circumference surface at an opening end portion.

On the other hand, the cylindrical convex portion 66 that can be inserted into the concave portion 65 is formed at a raw water inlet 69 of the filtration portion 62. The convex portion 66 has a diameter slightly smaller than the interior diameter of the concave portion 65 defined at the tip end portion of the pair of the concave portion side overhang portions 68. The convex portion 66 is provided with a pair of convex portion side overhang portions 71 on the outer surface at the tip end. The overhang portions 71 are formed so that they are respectively allowed to go into the pair of notch portions 67 formed on the inner circumference surface of the concave portion 65.

According to the above arrangement, the convex portion 66 is inserted into the concave portion 65, and then the both are displaced relatively to each other around the coaxial core, whereby the water purifier main body 61 and the filtration portion 62 are coupled to each other. In other words, the concave portion side overhang portions 68 and the convex portion side overhang portions 71 are engaged with each other at their respective opposing surfaces. Also, according to the above arrangement, by displacing the convex portion 66 and the concave portion 65 relatively to each other in a direction opposite to the engaging direction, the concave portion side overhang portions 68 and the convex portion side overhang portions 71 are spaced apart from each other, thereby allowing the filtration portion 62 to be detached from the water purifier main body 61.

To be more specific, as shown in FIG. 12, the surfaces of the convex portion side overhang portions 71 that engage with the surfaces of the concave portion side overhang portions 68 are tilted toward the axial direction, which not only makes relative displacement of these components toward the axial direction smooth, but also improves engaging adhesion to each other. The convex portion side overhang portions 71 are provided with stoppers 72 at the end portions for regulating relative displacement of the convex portion 66 and the concave portion 65 around the coaxial core. When the end portions of the concave portion side overhang portions 68 are stopped by the stoppers 72, the overhang portions 68 and 71 are engaged with each other, and the tip end surface of the convex portion 66 presses against a seal member 70, whereupon the convex portion 66 and the concave portion 65 are engaged with each other fluid-tight.

Further, the bayonet mechanism 63 is provided with an unillustrated seal member fall-off stopping portion on the inner circumference surface of the concave portion 65 so as to ensure the coupling condition during the engagement and to prevent a water leak or the like. Also, the seal member 70 is provided with an unillustrated step portion at the outer circumference, and the step portion is stopped by the seal member fall-off stopping portion, which prevents a fall-off of the seal member 70.

Next, the following description will describe a connection operation of the bayonet mechanism 63 with reference to FIG. 12. Initially, in order to couple the filtration portion 62 to the water purifier main body 61 that is immovably attached in an upright position, as shown in the drawing, the convex portion side overhang portions 71 of the convex portion 66 provided to the filtration portion 62 need to be inserted into the notch portions 67 of the concave portion 65 provided to the water purifier main body 61. Hence, in a first step, the filtration portion 62 is rotated around the axial core so that the longitudinal direction of the filtration portion 62 becomes in parallel or almost in parallel with the horizontal direction, under which condition, the convex portion side overhang portions 71 are inserted into the notch portions 67 provided to the water purifier main body 61.

Then, as a second step, the filtration portion 62 is rotated counterclockwise by approximately 90° when viewed from the water purifier main body 61. This allows the concave portion side overhang portions 68 to go into a space between a convex portion principal surface 73 and the convex portion side overhang portions 71 of the filtration portion 62, and the water purifier main body 61 and the filtration portion 62 are coupled to each other fluid-tight when the end portions of the concave portion side overhang portions 68 touch the stoppers 72. At this point, the longitudinal direction of the filtration portion 62 is vertical.

According to the conventional water purifier discussed above, however, the operation to engage the filtration portion 62 with the water purifier main body 61 involves the first and second steps with no exception, which poses a problem that the attachment job is time-consuming. In other words, in the case of inserting the convex portion side overhang portions 71 into the notch portions 67 of the concave portion 65 provided to the water purifier main body 61, if the position of the filtration portion 62 with respect to the immovably attached water purifier main body 61 is determined incorrectly, merely an inserting operation takes a long time. Moreover, the user has to pay attention to a rotational direction of the filtration portion 62. Hence, the conventional water purifier has a problem that it unexpectedly demands time-consuming operations.

Also, according to the conventional water purifier as described above, the convex portion 66 and the concave portion 65 are engaged with or spaced apart from each other by inserting the former into the latter and displacing the both relatively to each other around the axial core. Hence, in case that a stream of water with a high water pressure flows in sporadically, a pressure may possibly be applied in a direction around the axial core. In such a case, if the pressure applying direction is a direction in which any movement is regulated by the stoppers 72 (a rotational direction that generates a spaced apart condition), the water purifier main body 61 and the filtration portion 62 are spaced apart from each other, which causes the filtration portion 62 to fall off. Hence, the conventional water purifier has a problem that there is a likelihood that the filtration portion falls off when a stream of water with a high water pressure flows in sporadically.

On the other hand, in terms of management for sanitation of a water purifier equipped with a compact filtration portion, there has been a demand for a function of notifying the user of a service life unique to each filtration material, that is, the time of replacement of the filtration material. For example, a PID (Performance Indication Device) or the like is known as an example of an accessory device for the water purifier furnished with such a function.

Water purifiers disclosed in U.S. Pat. Nos. 5,928,504 and 5,888,381 are known as examples of a mechanism of notifying the user of the time for replacement of the filtration material by the PID or the like.

For example, U.S. Pat. No. 5,928,504 supra discloses a mechanism for mechanically accumulating a total volume of raw water that has been filtered, and a valve mechanism for stopping an incoming flow of raw water when a predetermined volume of raw water has been filtered, etc.

According to the mechanisms disclosed in the above-cited publication, a turbine is provided in a channel for raw water flowing through a cartridge, and the turbine is rotated by a stream of water while a rotational speed of the turbine is lowered as needed by a plurality of gears connected to the turbine, whereby a total volume of raw water passing through the cartridge is accumulated mechanically.

However, in order to accumulate a total volume of water by the mechanical method using the mechanisms described in the above-cited publication, it is necessary to provide a rotary mechanism composed of a combination of a turbine, a plurality of gears, etc. inside the cartridge, which undesirably increases the cartridge itself in size, thereby posing a problem that it becomes difficult to save a space.

On the contrary, there has been disclosed a mechanism that notifies the time of replacement of the filtration material not by directly accumulating a total volume of raw water that has been filtered, but by accumulating time while raw water is filtered (filtration time) with an electric circuit. For example, a water purifier disclosed in U.S. Pat. No. 5,888,381 supra has an arrangement, in which the vicinity of an end cap of the filtration material is sealed airtight with a flexible cap having a diameter slightly larger than that of the end cap, and a substantially S-shaped conductive arm provided to the outside of the flexible cap is directly attached.

The conductive arm is arranged in such a manner that, when an internal pressure in the flexible cap rises with filtration by the filtration material, the conductive arm amplifies the internal pressure in the flexible cap, so that the tip end of the conductive arm is brought into contact with the electric circuit.

In other words, according to the above arrangement, water fills in a space between the flexible cap and the filtration material and the internal pressure keeps rising during filtration, which expands the flexible cap and causes the tip end of the conductive arm to move toward the electric circuit to be brought into contact with an input portion of the electric circuit. In this manner, the water purifier disclosed in the above-cited application accumulates filtration time by closing the electric circuit inside the cartridge.

However, the cartridge using the flexible cap conveys a change in water pressure inside the cartridge to the outside by means of the flexible cap. Accordingly, not only a metal conductive arm for amplifying a change in water pressure, but also a connecting member for the conductive arm have to be used. For this structural reason, the conductive arm and the electric circuit board are exposed and the indicator portion and the cartridge portion will not be fluid-tight. This poses a problem that there is a high risk that the user may erroneously wet the electric circuit board when he replaces the cartridge.

Also, the method using the flexible cap as described above utilizes flexibility of the overall flexible cap. Hence, there is a problem that materials of the flexible cap are limited to those having flexibility at or above a certain level. In addition, in order to readily amplify a change in water pressure, each of the members, such as the flexible cap and the conductive arm, have to be increased in size. This makes it difficult to save a space, and increases the number of components, and hence the manufacturing costs.

SUMMARY OF THE INVENTION

It is therefore an object of the present invention to provide a water purifier equipped with a connection mechanism, with which a user can connect a cartridge to a water purifier main body in a single step with ease in a secure manner, and a filtration portion will not easily fall off even when water with a high water pressure flows in. It is another object of the present invention to provide a water purifier filtration portion capable of notifying the user of the service life of the filtration material accurately, ensuring a fluid-tight condition between an indicator portion and a cartridge portion, reducing a number of components, and saving a space in the vicinity of the faucet, and a water purifier including the same.

In order to achieve the above and other objects, a water purifier main body of the present invention includes: a raw water inlet; a raw water supply inlet; and a main body side coupling portion that couples to a water purifier filtration portion for filtering raw water flowing in from the raw water inlet at the raw water supply inlet in a detachable and attachable manner, wherein the main body side coupling portion is provided with a main body side stopping member for coupling the water purifier filtration portion to the water purifier main body by stopping and being stopped by a filtration portion side stopping member provided to the water purifier filtration portion, and wherein the main body side stopping member is provided to the main body side coupling portion in such a manner that the main body side stopping member is allowed to move only in one direction that intersects substantially at right angles with an axial core direction of the main body side coupling portion in a connection operation and a disconnection operation of the water purifier filtration portion and the water purifier main body.

In order to achieve the above and other objects, a water purifier filtration portion of the present invention includes: a raw water accepting inlet for accepting raw water from a water purifier main body; a purified water outlet for releasing purified water to an outside; and a filtration portion side coupling portion that couples to the water purifier main body at the raw water accepting inlet in a detachable and attachable manner, wherein the filtration portion side coupling portion is provided with a filtration portion side stopping member for coupling the water purifier filtration portion to the water purifier main body by stopping and being stopped by a main body side stopping member provided to the water purifier main body, and wherein the filtration portion side stopping member is provided in such a manner that the filtration portion side stopping member is allowed to move only in one direction that intersects substantially at right angles with an axial core direction of the filtration portion side coupling portion in a connection operation and a disconnection operation of the water purifier filtration portion and the water purifier main body.

In order to achieve the above and other objects, a water purifier of the present invention includes at least one of the water purifier main body and the water purifier filtration portion discussed above.

According to the above arrangements, the main body side coupling portion is provided with the main body side stopping member for coupling the water purifier filtration portion to the water purifier main body by stopping and being stopped by the filtration portion side stopping member provided to the water purifier filtration portion. Hence, it is possible to connect the water purifier filtration portion to the water purifier main body in a single step with ease in a secure manner. Also, the main body side stopping member is provided in such a manner that the main body side stopping member is allowed to move only in one direction that is substantially perpendicular to a flowing direction of water passing by the main body side coupling portion in the connection operation and the disconnection operation. Hence, even when a load is applied to the main body side stopping member or the filtration portion side stopping member by a sporadic change in water pressure, the connection will not be disconnected unless a partial pressure that causes the main body side stopping member to move in the above-specified one direction is applied, which prevents the main body side stopping member from being detached easily. Consequently, it is possible to provide a water purifier main body equipped with a connection mechanism, with which the filtration portion will not fall off easily even when water with a high water pressure flows in.

In order to achieve the above and other objects, a water purifier filtration portion of the present invention includes: a drum; and a display portion connected to the drum in a detachable and attachable manner, wherein the drum includes: a raw water accepting inlet for accepting raw water from a raw water supply source; a purified water outlet for releasing purified water to an outside; and a supporting portion for placing a filtration material in a channel between the raw water accepting inlet and the purified water outlet, wherein the display portion includes: an electric circuit, provided with a first output portion and a first input portion, for accumulating time while the first input portion is switched ON and for outputting an output corresponding to accumulated time from the first output portion; and a first conductive member for switching ON the electric circuit at the first input portion when an internal pressure in the channel rises, wherein the drum is provided with a resilient body on a wall surface thereof and a pressure sensing portion formed from a protrusion portion protruding toward the display portion from the resilient body, wherein the first conductive member is isolated from the drum, and is provided at a position where the first conductive member is brought into contact with the first input portion by a water pressure conveyed from the pressure sensing portion through the protrusion portion to close the electric circuit.

According to the above arrangement, the pressure sensing portion provided to the drum is formed from the resilient body provided on the wall surface of the drum and the protrusion portion protruding toward the display portion from the resilient body. Hence, while a fluid flown in from the raw water accepting inlet flows through the channel, the pressure sensing portion expands and extends due to its resilience in response to an internal pressure in the channel. Also, the protrusion portion is formed to protrude from the resilient body. Hence, by converting the expansion and extension of the resilient body into a slight movement toward the display portion, it is possible to convey such expansion and extension accurately. Also, the first conductive member is separated from the drum and the electric circuit. Hence, the drum, which is to be replaced, can be of a simpler structure, so that not only can a total number of components be reduced, but also a space can be saved. Also, the first conductive member is provided at a position where it is brought into contact with the first input portion by a water pressure conveyed from the pressure sensing portion to close the electric circuit. Hence, it is possible to notify the service life of the filtration material accurately by accumulating time while water pressure is sensed.

For a fuller understanding of the nature and advantages of the invention, reference should be made to the ensuing detailed description taken in conjunction with the accompanying drawings.

DESCRIPTION OF THE EMBODIMENTS

The following description will describe one embodiment of the present invention with reference to the accompanying drawings.

Figure 1:
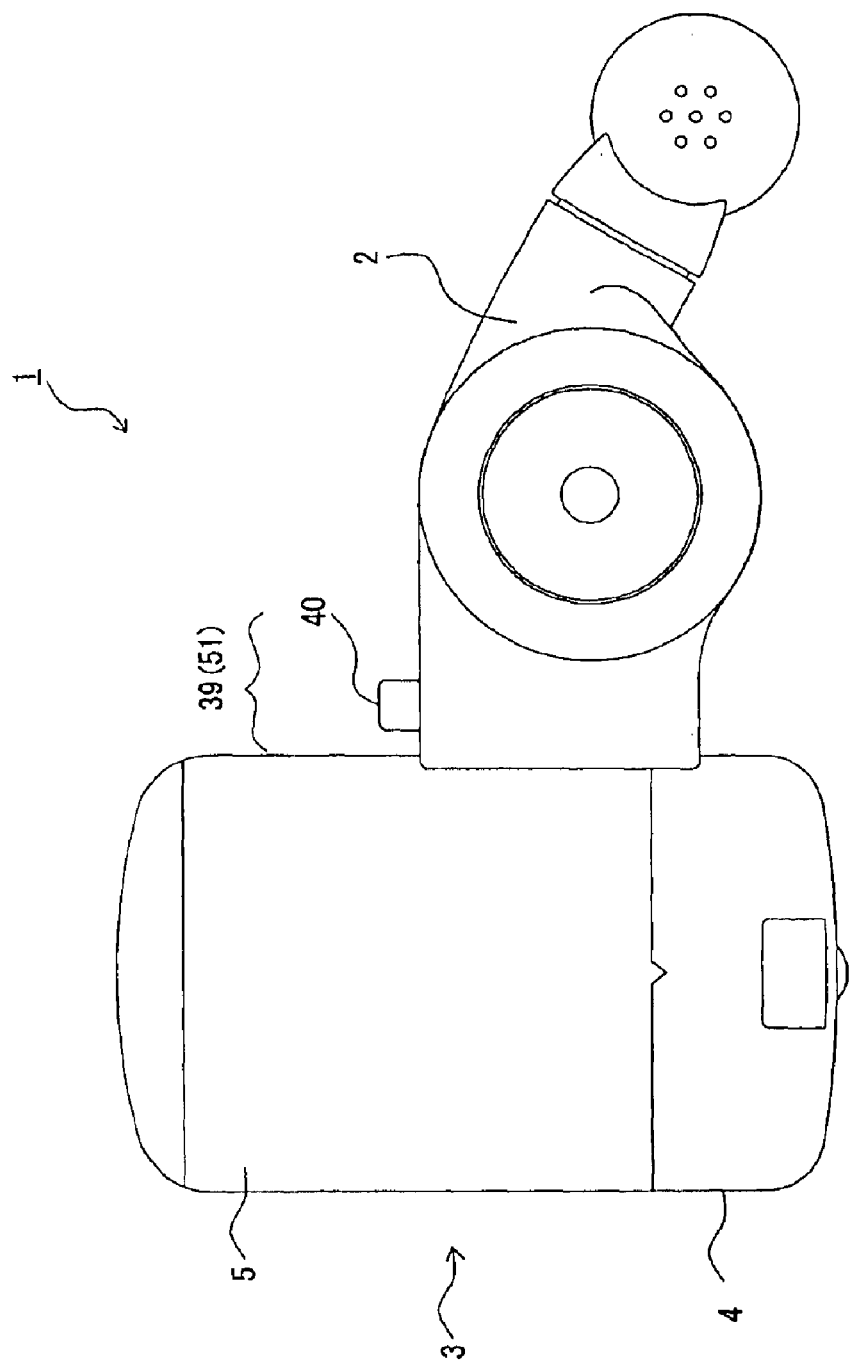
FIG. 1 is a plan view schematically showing an arrangement of a water purifier according to one embodiment of the present invention.
Figure 2:
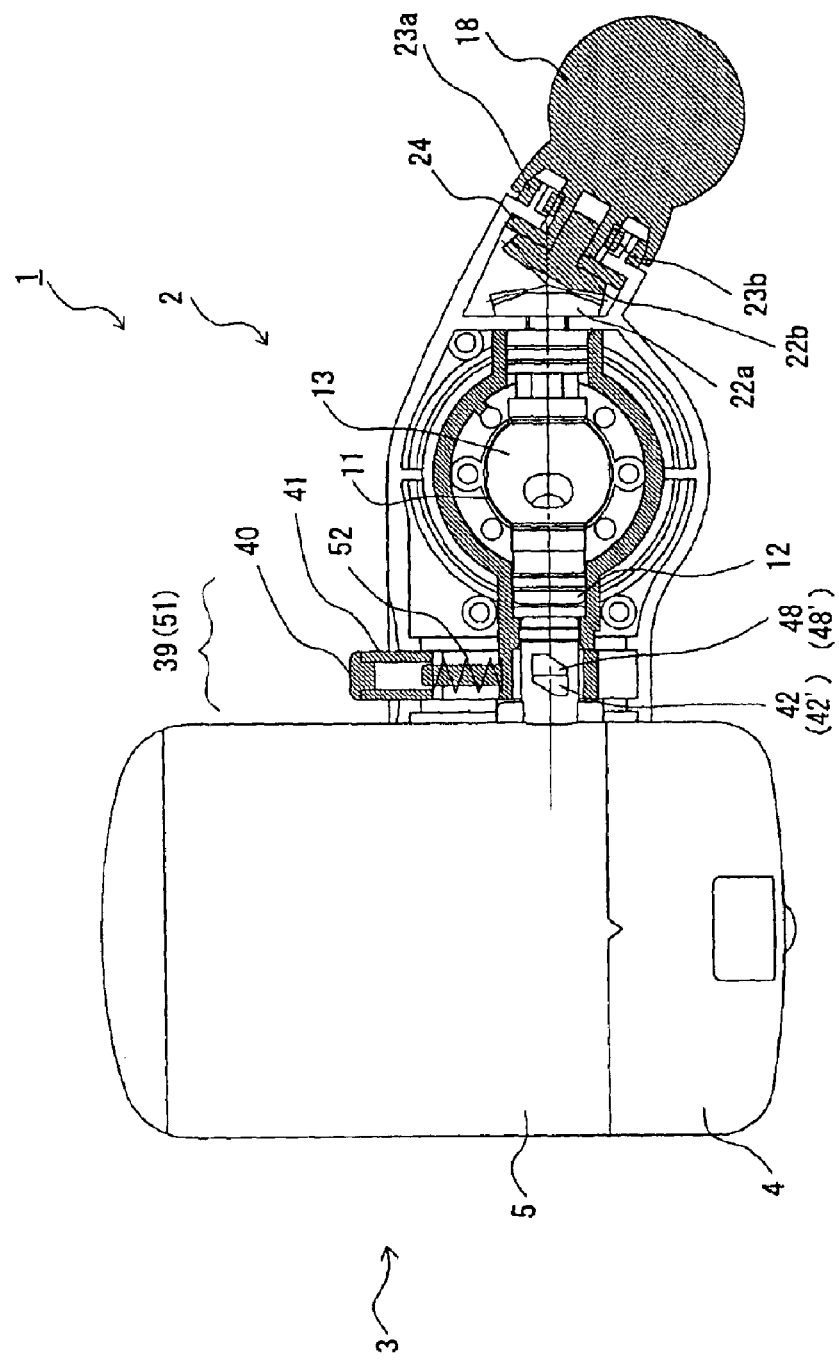
FIG. 2 is an explanatory view replacing the plan view in FIG. 1 with a cross section for a water purifier main body portion alone.
Figure 3:
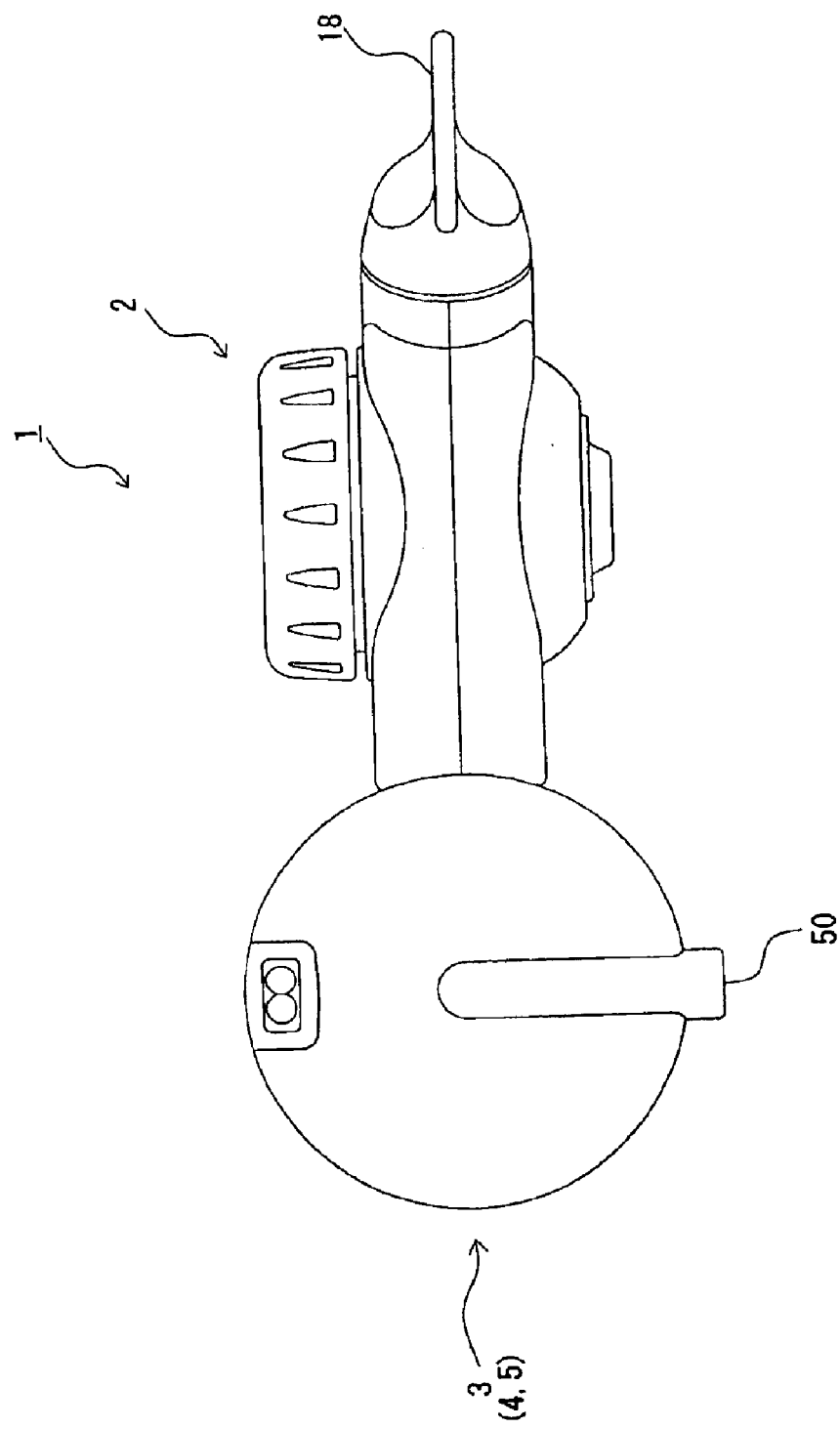
FIG. 3 is a front view schematically showing the arrangement of the water purifier according to one embodiment of the present invention.
Figure 4:
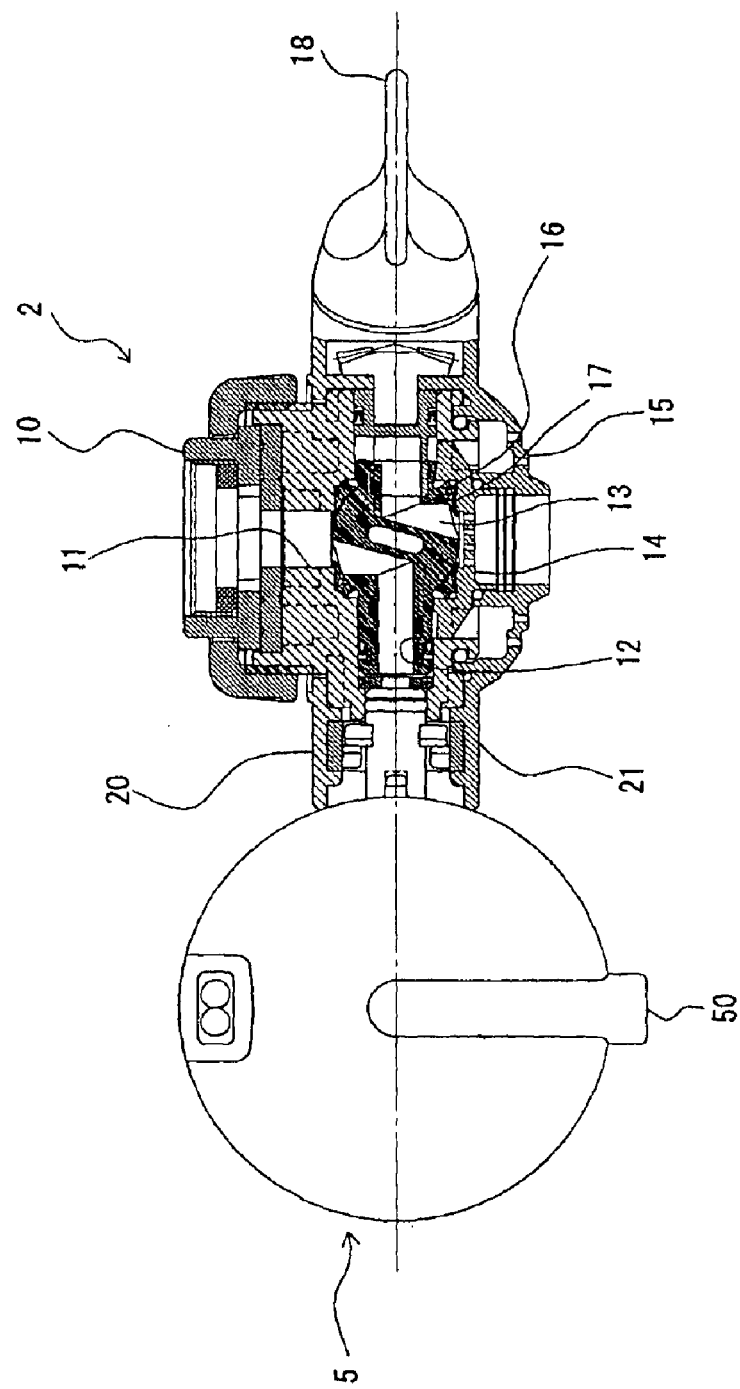
FIG. 4 is an explanatory view replacing the front view in FIG. 3 with a longitudinal section for the water purifier main body portion alone.

FIG. 1 is a plan view schematically showing an arrangement of a water purifier according to the present embodiment. FIG. 2 is an explanatory view replacing the plan view in FIG. 1 with a cross section for a valve main body 2 alone. FIG. 3 is a front view schematically showing the arrangement of the water purifier according to the present embodiment. FIG. 4 is an explanatory view replacing the front view in FIG. 3 with a longitudinal section for the valve main body 2 alone.

As is shown in FIG. 1, a water purifier 1 according to the present embodiment is composed of the valve main body 2 (a water purifier main body) coupled to an unillustrated tap water faucet, and a filtration portion 3 (water purifier filtration portion), connected to the valve main body 2 in a detachable and attachable manner, for holding a filtration material that filters raw water flown from the valve main body 2. Further, as shown in FIG. 2, the filtration portion 3 is composed of a cartridge 5 for holding the filtration material, and an indicator portion 4 connected to the cartridge 5 in a detachable and attachable manner.

As shown in FIG. 4, the valve main body 2 is connected to the unillustrated tap water faucet by means of an adapter 10. The valve main body 2 is provided with: an opening portion 11 (raw water inlet) formed at the connection portion with the adapter 10, from which raw water from the tap water faucet flows in; an outlet 14 for directly releasing raw water flown into the valve main body 2 from the opening portion 11 without being filtered; a shower outlet 15 for releasing raw water flown from the opening portion 11 through minute pores without being filtered; a supply inlet 12 (raw water supply inlet) for supplying the cartridge 5 with raw water accepted from the opening portion 11; a 3-way switching valve 13 for introducing raw water accepted from the opening portion 11 into any of the foregoing channels the user wishes to use; a handle 18 (holding portion) for enabling the user to switch the channels in association with the 3-way switching valve 13; a top portion cover 20; and a bottom portion cover 21.

The 3-way switching valve 13 is supported by a star packing 16 sandwiched between a star packing supporting portion 17 and the 3-way switching valve 13 at its outer curved surface portion in such a manner that it is allowed to slide. In the present embodiment, the 3-way switching valve 13 is used for selectively switching channels in three directions. It should be appreciated, however, that a multi-direction valve for selectively introducing water to four or more channels may be used as well.

Also, as shown in FIG. 2, the handle 18 used in the channel switching operation by the 3-way switching valve 13 is connected to the valve main body 2 in a direction tilted by a predetermined angle toward the user with respect to the axial core direction of the supply inlet 12 (a direction indicated by an alternate long and short dash line in FIGS. 2 and 4), that is, a flowing direction of water (raw water) passing by a coupling portion between the valve main body 2 and the cartridge 5. In the present embodiment, the axial core direction of the supply inlet 12 and the protruding direction of the handle 18 produce an angle of approximately 30°. By slightly protruding the handle 18 toward the user in this manner, not only can the user hold the handle 18 easily without reaching his arms forward, but also he can turn the handle 18 more easily. Consequently, the ease of operation for the user when switching the channels can be improved significantly compared with a case where the handle 18 protrudes along the axial core direction.

The angle produced by the axial core direction and the protruding direction of the handle 18 is not especially limited. However, a range from 20° to 50° is preferable, and a range from 25° to 40° is further preferable.

Besides the arrangement of protruding the handle 18 by the above-specified angle, the present embodiment is arranged to employ a bevel gear provided with gears 22a and 22b and a gear ring 24 as shown in FIG. 2 as a transmission member for connecting the 3-way switching valve 13 and the handle 18 to further improve the transmitting property to the 3-way switching valve 13 and the ease of operation for the user. The bevel gear is a gear provided with radially aligned teeth on the conical surface, and is of a shape of an opened umbrella. The axis for transmitting a rotation and the axis for receiving the transmitted rotation are not in parallel with each other and placed so as to produce the above-specified angle, whereby power is transmitted.

In the present embodiment, the gear 22b starts to rotate first in direct association with the turning of the handle 18. The gear 22b is a bevel gear provided with teeth on its conical surface, and these teeth engage with the teeth also formed on the conical surface of a bevel gear serving as the gear 22a in such a manner that the above-specified angle is produced. Consequently, the turning of the handle 18 is transmitted in the form of a rotation around the axial core direction of the supply inlet 12 that produces the above-specified angle. As shown in the drawing, the connection portion of the handle 18 and the gear 22b is provided with a cover ring 23a composed of the top portion cover 20 and the bottom portion cover 21 at the valve main body 2 side for reinforcing the connection so that a semi-circular bearing portion supporting the axis of the gear 22b will not be separated.

Further, in order to ensure the switching operation to the three directions by the turning of the handle 18, a click 23b for playing a role of a rotation stopper and a role of notifying the user of the mode switching (channel switching) position of the 3-way switching valve 13 every 90° with a clicking sound is provided to the inner side of the cover ring 23a along the axial core of the handle 18. Also, the gear ring 24, which is necessary as an auxiliary component when incorporating the bevel gear, is provided at the bottom portion of the umbrella of the gear 22b.

Raw water flows in through a raw water accepting inlet 32 from the valve main body 2, passes by a minute space between the inner wall surface of the cartridge 5 and an unillustrated cylindrical carbon block (filtration material), and permeates through the carbon block across the side surface thereof. Then, having been filtered by the carbon block, water passes by a hollow portion of the carbon block, and is then supplied to the outside from a purified water outlet 50 of the indicator portion 4.

The carbon block is a block of solidified activated carbon powder with a cylindrical hollow inside. The cylindrical side surface is exposed to raw water accepted from the valve main body 2, and the both end surfaces are covered with disk lids.

One of the lids entirely covers one end surface including the cylindrical hollow portion, and it is arranged in such a manner that filtrate passing through the filtration material and flowing into the hollow portion will not leak from the top portion of the hollow portion. The other lid is a toroidal disk having an opening for the hollow portion at the center thereof, and it is arranged in such a manner so as to introduce filtrate flown into the hollow portion to the purified water outlet 50. In other words, as has been described above, the carbon block is supported axially as a part thereof is inserted into a filtration material supporting portion that also serves as the filtrate supply inlet for introducing the opening portion of the cylindrical hollow portion to the purified water outlet 50.

Next, the following description will describe a coupling mechanism of the valve main body 2 and the filtration portion 3 in the water purifier 1 according to the present embodiment. Herein, the valve main body 2 and the filtration portion 3 are connected to each other in a detachable and attachable manner by a main body side coupling portion 39 enclosing the supply inlet 12 of the valve main body 2 and a filtration portion side coupling portion 51.

Figure 5A:
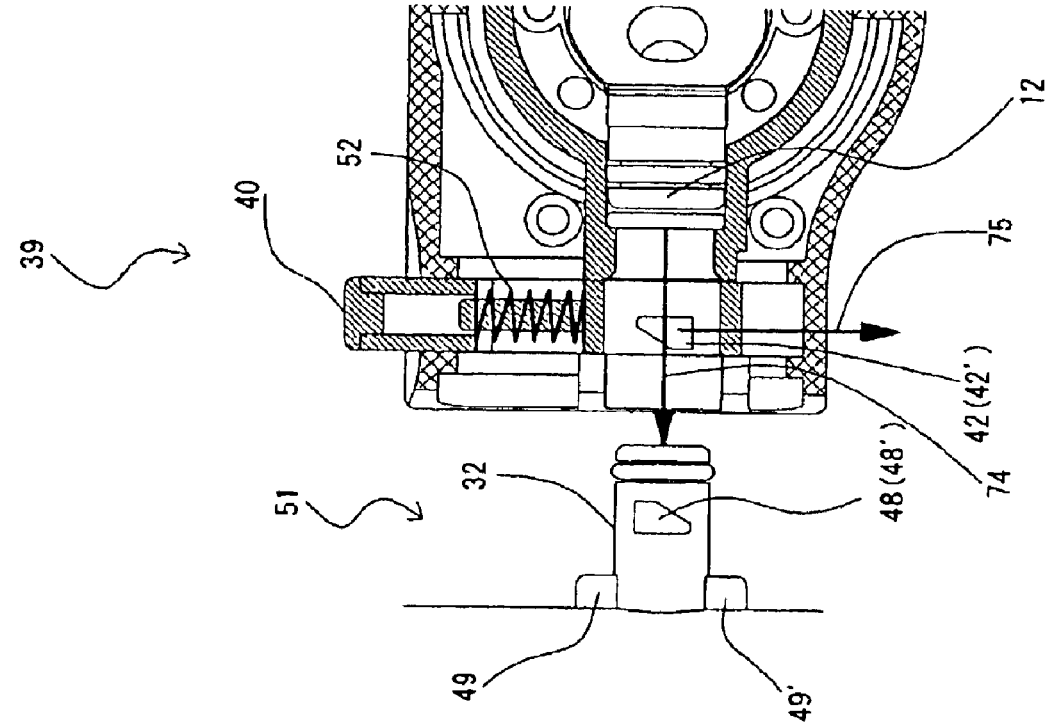
FIG. 5(a) is an explanatory view showing a main body side coupling portion of the water purifier according to one embodiment of the present invention when viewed from a water purifier filtration portion.

FIG. 5(*a*) is an explanatory view showing the main body side coupling portion 39 when viewed from the cartridge 5 (water purifier filtration portion). As shown in the drawing, the main body side coupling portion 39 is provided with: the top portion cover 20 and the bottom portion cover 21 forming a part of the contour of the valve main body 2; a pair of outer edge portions 46 and 46' defined along the inner wall of an opening portion formed when the covers 20 and 21 are fit in; a release button 41 (supporting member) sandwiched by the pair of the outer edge portions 46 and 46' so that it is allowed to move (slide) only in the vertical direction in the drawing, that is, one particular direction (indicated with arrow 75 in FIG. 5(*b*)) that intersects substantially at right angles with the axial core direction (indicated with arrow 74 in FIG. 5(*b*)) of the main body side coupling portion 39; a spring 52 (resilient body) for pushing the release button 41 with tension exerted onto the release button 41 in the sliding direction; a button cover 40 for pressing the release button 41 inward against the tension of the spring 52 when the user performs a disconnection operation; stoppers 47a and 47b (main body side fitting member) provided to the opening portion at a position at the side of the cartridge 5 with respect to the release button 41; and a pair of stoppers 42 and 42' (main body side stopping member) provided on a frame 43 of the release button 41 to protrude inward. The release button 41 is of a frame shape formed along the inner wall of the opening portion provided to the main body side coupling portion 39.

The axial core direction of the main body side coupling portion 39 referred to herein is, to be more specific, the axial core direction of the supply inlet 12 of the valve main body 2 housed in the main body side coupling portion 39, that is, the cylindrical axial direction of the raw water supply inlet formed in a cylindrical shape. In other words, the axial core direction of the main body side coupling portion 39 corresponds to the flowing direction of raw water passing by the raw water supply inlet, or a direction along which the supply inlet 12 is inserted into the main body side coupling portion 39 in the connection operation. Hence, the direction intersecting substantially at right angles with the axial core direction is one of arbitrary directions that intersect substantially at right angles with the flowing direction of raw water passing by the raw water supply inlet.

As has been discussed, the main body side stopping member is provided in such a manner that it is allowed to move only in one direction that intersects substantially at right angles with the axial core direction. To be more specific, in the present embodiment, the release button 41 is sandwiched by the pair of the outer edge portions 46 and 46' in such a manner that it is allowed to slide. In other words, the release button 41 is allowed to move only in one particular direction that intersects substantially at right angles with the axial core direction of the supply inlet 12, and moves only in the above-specified one particular direction in association with the connection operation and the disconnection operation with the connection mechanism. Thus, even when a water pressure changes sporadically at the main body side coupling portion 39, the main body side stopping member will not fall off unless a partial pressure of the water pressure that causes the main body side stopping member to move in the above-specified one particular direction is applied.

FIG. 5(*b*) is an explanatory view showing a structure of the main body side coupling portion 39 projected onto the plan view of the valve main body 2, and depicting the corresponding filtration portion side coupling portion 51 of the cartridge 5. As shown in the drawing, the stoppers 42 and 42' are column-wise protrusions formed from prisms protruding in an inward direction of the opening portion from the frame 43, and the bottom surface of each prism, that is, the attachment surface to the frame 43, is a substantially trapezoidal surface. Also, the substantially trapezoidal surface protrudes in a positional relation such that the top and the base of the substantially trapezoidal surface are in parallel with the above-specified one particular direction and the side surface of the prism corresponding to the oblique side of the substantially trapezoidal surface faces the cartridge 5. In this case, the substantially trapezoidal surface may mean an exact trapezoid, but in the present embodiment, the bottom surface is a trapezoid having round apexes. Hence, strictly speaking, the stoppers 42 and 42' are not prisms, and they can be best described as pillar-wise protrusions formed from prisms having round sides. By forming the bottom surface not exactly trapezoidal but substantially trapezoidal as described above, it is possible to make the surface of the prism smoother, which enables the user to perform the connection operation and the disconnection operation more smoothly.

Also, as shown in the drawing, the filtration portion side coupling portion 51 is provided with the cylindrical raw water accepting inlet 32 provided to a part of the side surface of the cartridge 5, a pair of stoppers 48 and 48' protruding from the cylindrical side surface of the raw water accepting inlet 32, and a pair of rotation preventing stoppers 49 and 49' protruding from the vicinity of the attachment portion of the cartridge 5 at the raw water accepting inlet 32.

The pair of stoppers 48 and 48' provided to the filtration portion side coupling portion 51 are substantially identical with the stoppers 42 and 42' in shape. In other words, they are composed of pillar-wise protrusions formed from prisms having substantially trapezoidal bottom surfaces. Also, the stoppers 48 and 48' are formed at the raw water accepting inlet 32 so as to protrude in reversed directions both in the vertical and horizontal directions with respect to the stoppers 42 and 42'. In other words, each substantially trapezoidal surface protrudes in a positional relation such that the top and the base of the substantially trapezoidal bottom surface are in parallel with the above-specified one particular direction, and the side surface of the prism corresponding to the oblique side of the substantially trapezoidal surface touches the side surface (slanted surface) also corresponding to the oblique side of the substantially trapezoidal surface of the opposing stopper 42 or 42' at the beginning of the connection operation. Thus, according to the above arrangement, when the filtration portion side coupling portion 51 and the main body side coupling portion 39 are connected, the stoppers 48 and 48' and the stoppers 42 and 42' are stopped by each other.

Figure 6A:
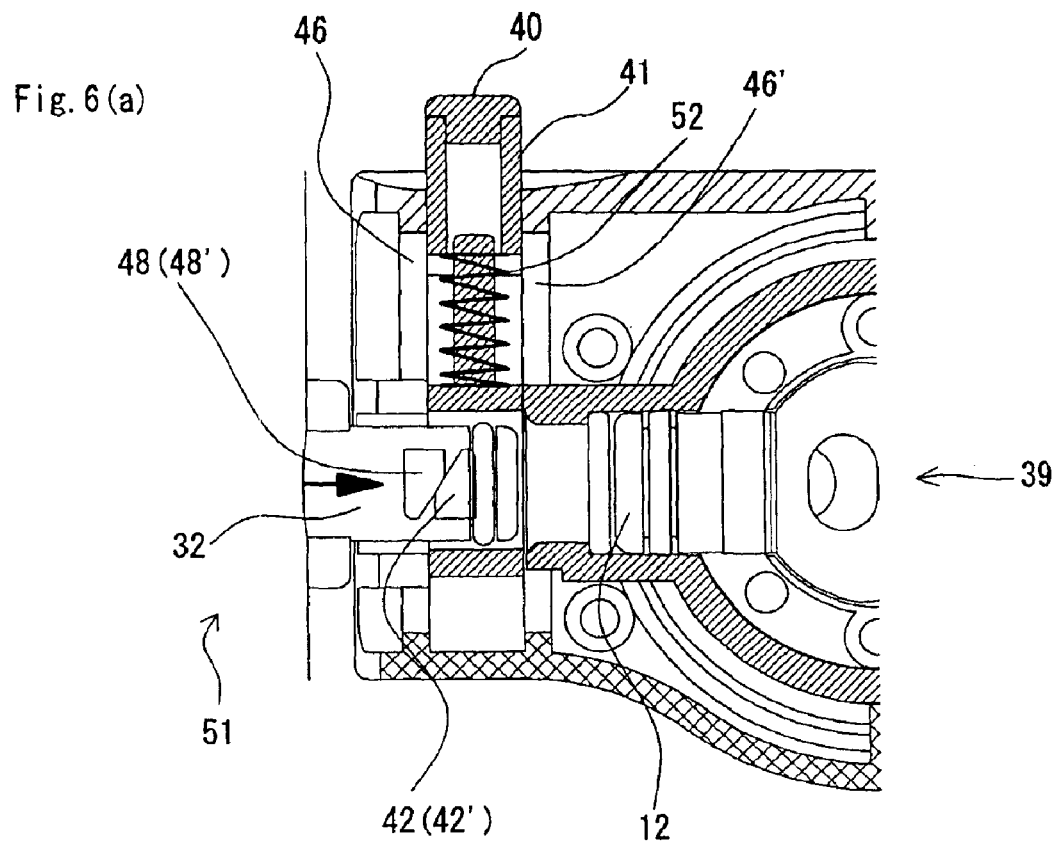
FIG. 6(a) is an explanatory view showing an interior structure of the main body side coupling portion and the filtration portion side coupling portion.
Figure 6B:
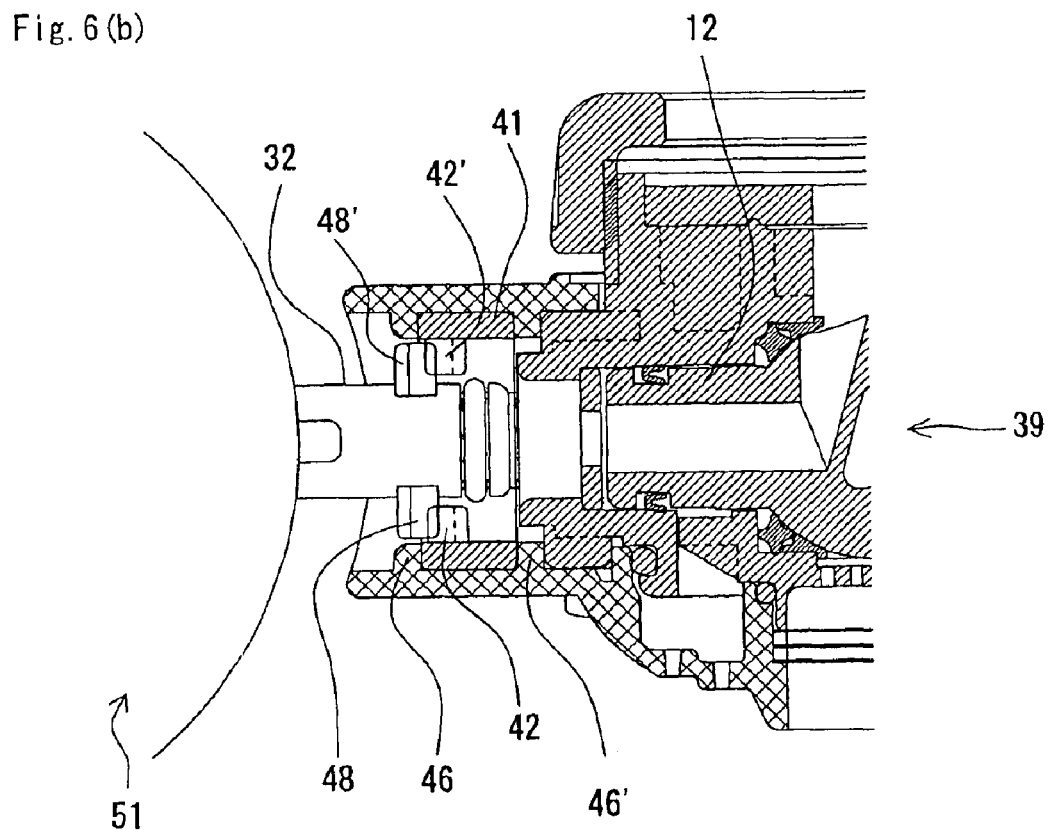
FIG. 6(b) is an explanatory view showing the interior structure of these components when projected onto a front view.
Figure 7A:
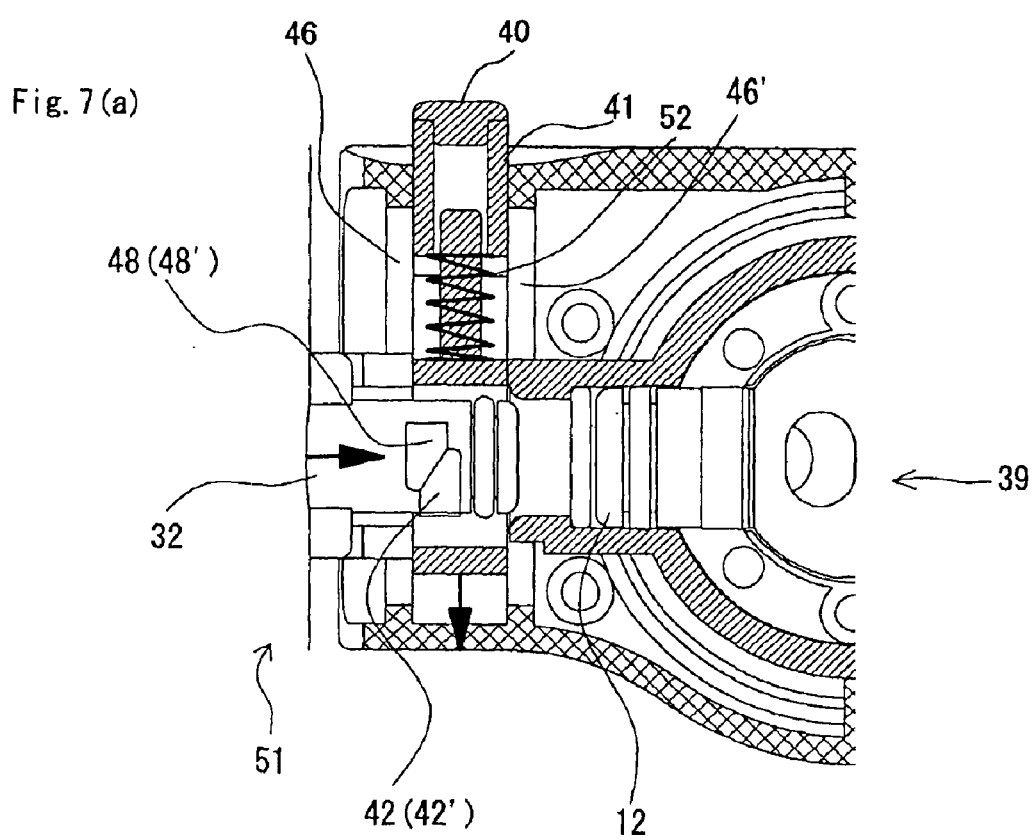
FIG. 7(a) is an explanatory view showing the interior structure of the main body side coupling portion and the filtration portion side coupling portion.
Figure 7B:
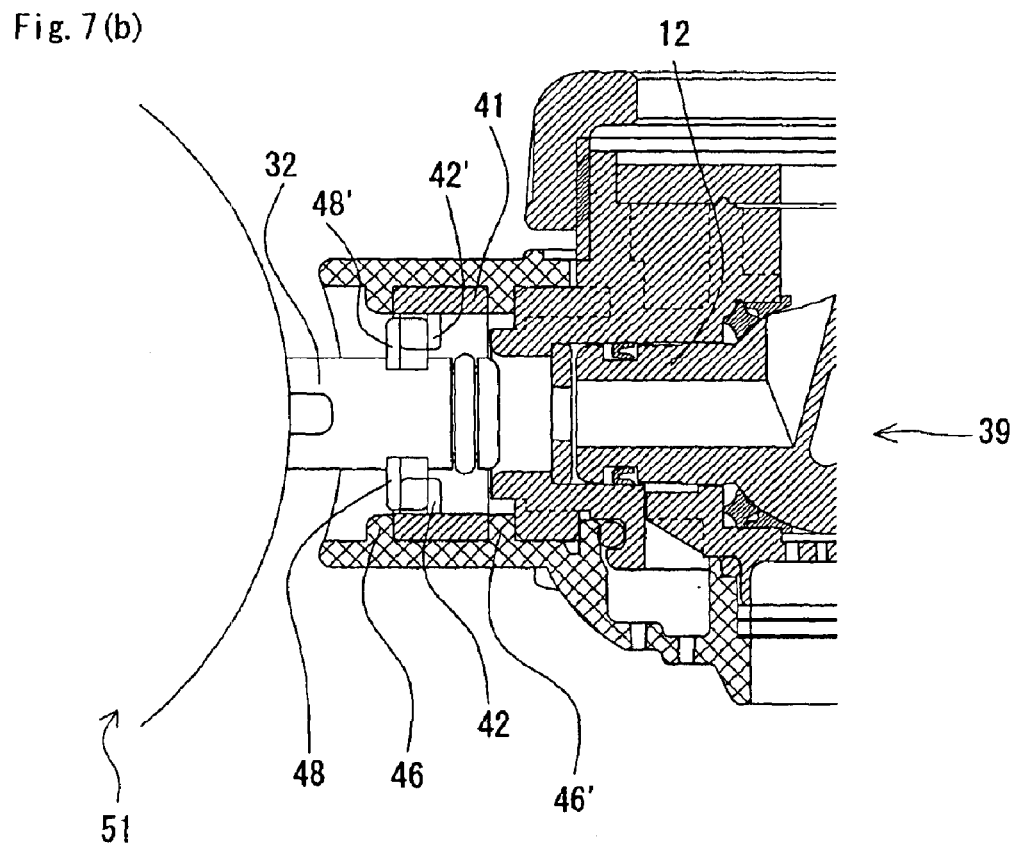
FIG. 7(b) is an explanatory view showing the interior structure of these components when projected onto a front view.
Figure 8A:
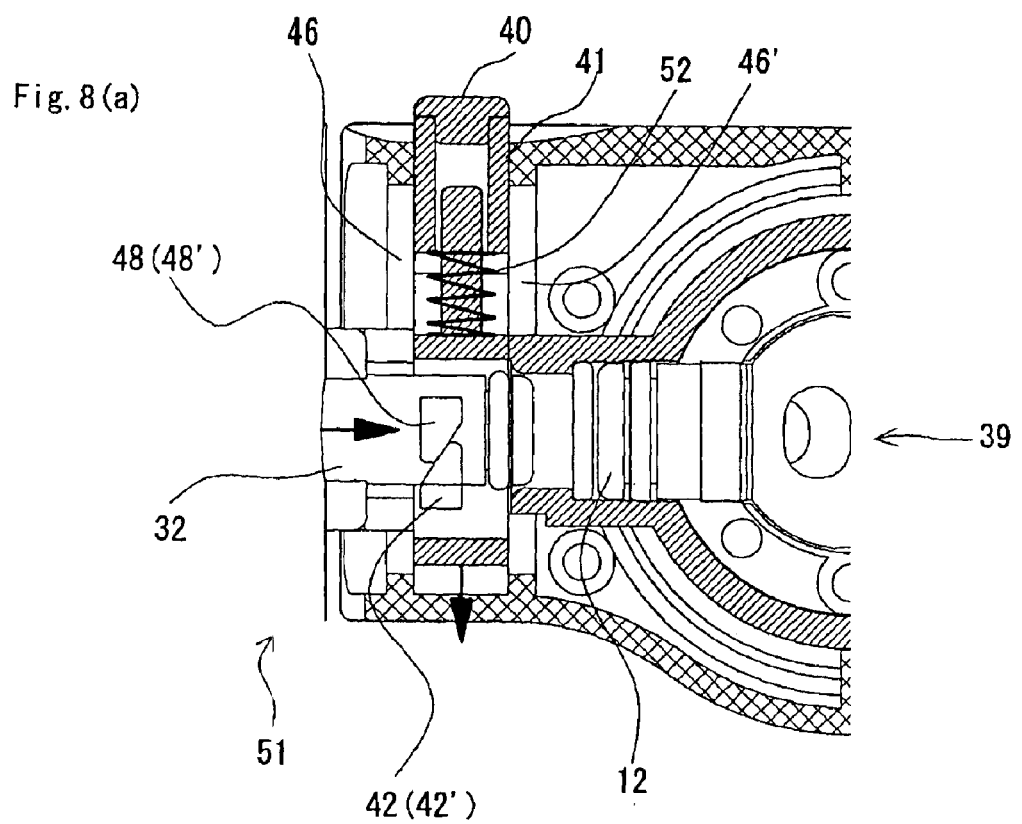
FIG. 8(a) is an explanatory view showing the interior structure of the main body side coupling portion and the filtration portion side coupling portion.
Figure 8B:
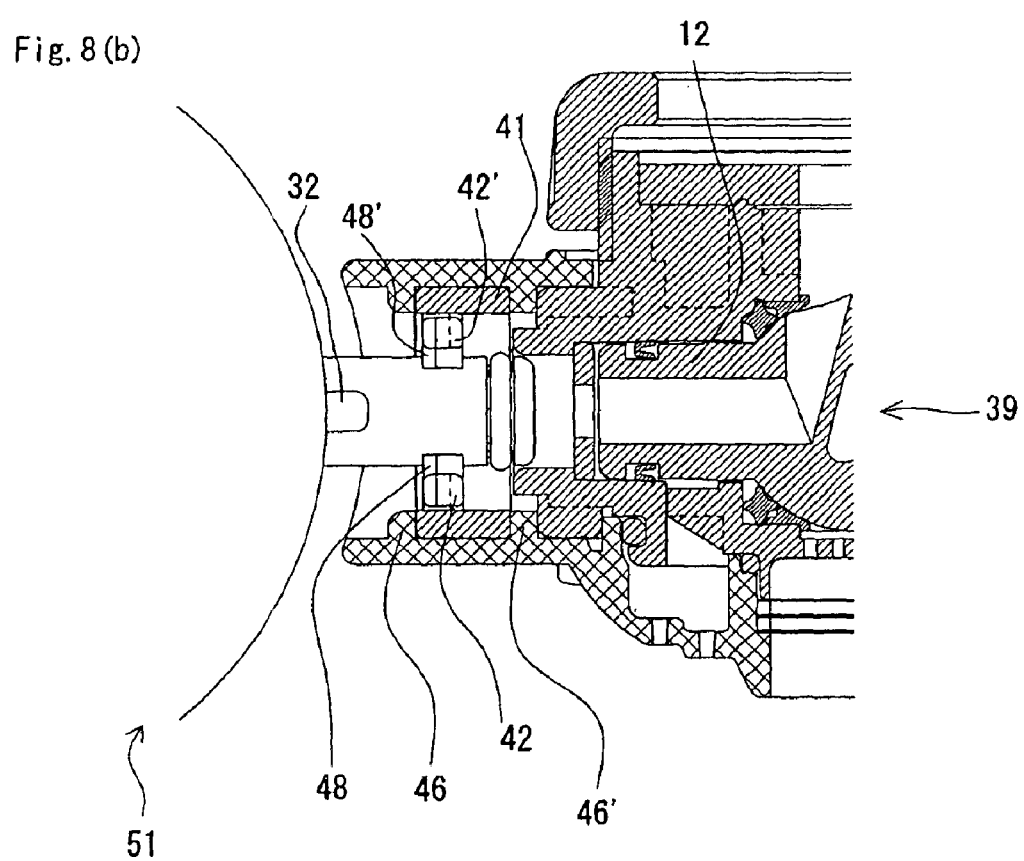
FIG. 8(b) is an explanatory view showing the interior structure of these components when projected onto a front view.

Next, the following description will describe a stopping operation between the stoppers 42 and 42' and the stoppers 48 and 48' in the connection operation of the valve main body 2 and the cartridge 5. FIGS. 6(*a*) through 11(*b*) are explanatory views showing the stopping operation of the stoppers 42 and 42' and the stoppers 48 and 48' over time. FIGS. 6(*a*), 7(*a*), 8(*a*), 9(*a*), 10(*a*), and 11(*a*) are explanatory views showing an interior structure of the main body side coupling portion 39 and the filtration portion side coupling portion 51 projected onto the plan view, and FIGS. 6(*b*), 7(*b*), 8(*b*), 9(*b*), 10(*b*), and 11(*b*) are explanatory views showing the interior structures of these components projected onto the front view.

Firstly, as shown in FIGS. 6(*a*) and 6(*b*), the tip end of the filtration portion side coupling portion 51 is inserted into the main body side coupling portion 39 at the beginning of the connection operation, and the stoppers 42 and 42' and the stoppers 48 and 48' touch with each other at the side surfaces corresponding to the oblique sides of the substantially trapezoidal surfaces, that is, their respective slanted surfaces opposing each other. By allowing the stoppers 42 and 42' and the stoppers 48 and 48' to touch with each other at the slanted surfaces in this manner, it is possible to enable the user to perform the connection operation and the disconnection operation smoothly, thereby improving the ease of operation.

The stoppers 42 and 42' are provided in such a manner that they are allowed to slide only in the predetermined sliding direction (the vertical direction in FIG. 6(*a*)) by the release button 41 to which the stoppers 42 and 42' are attached and by the pair of outer edge portions 46 and 46 sandwiching the release button 41. Hence, as shown in FIG. 6(*a*) through FIG. 11(*b*), the stoppers 42 and 42' move downward (sliding direction) in FIGS. 6(*a*), 7(*a*), 8(*a*), 9(*a*), 10(*a*), and 11(*a*) by a pressing pressure applied toward the main body side coupling portion 39 by the stoppers 48 and 48'. While the stoppers 42 and 42' move along the sliding direction in this manner, the stoppers 48 and 48' move toward the valve main body 2, whereupon the slanted surfaces of the stoppers 48 and 48' start to mount over the corresponding slanted surfaces of the stoppers 42 and 42'.

Figure 9A:
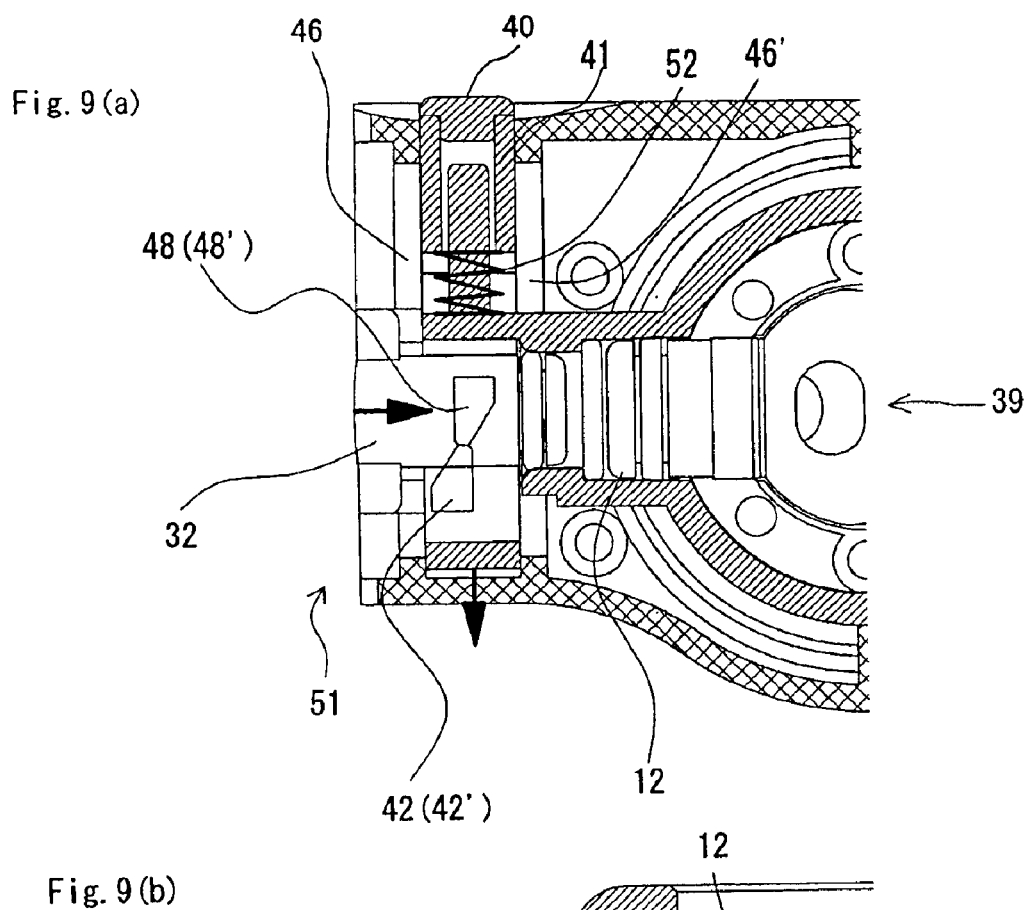
FIG. 9(a) is an explanatory view showing the interior structure of the main body side coupling portion and the filtration portion side coupling portion.
Figure 9B:
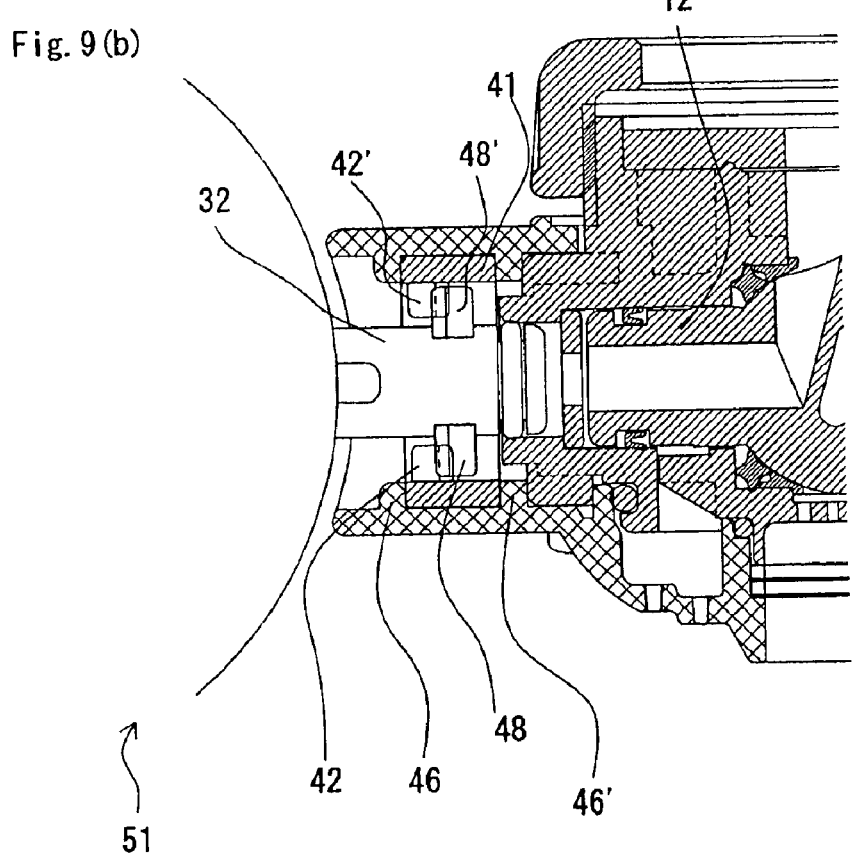
FIG. 9(b) is an explanatory view showing the interior structure of these components when projected onto a front view.
Figure 10A:
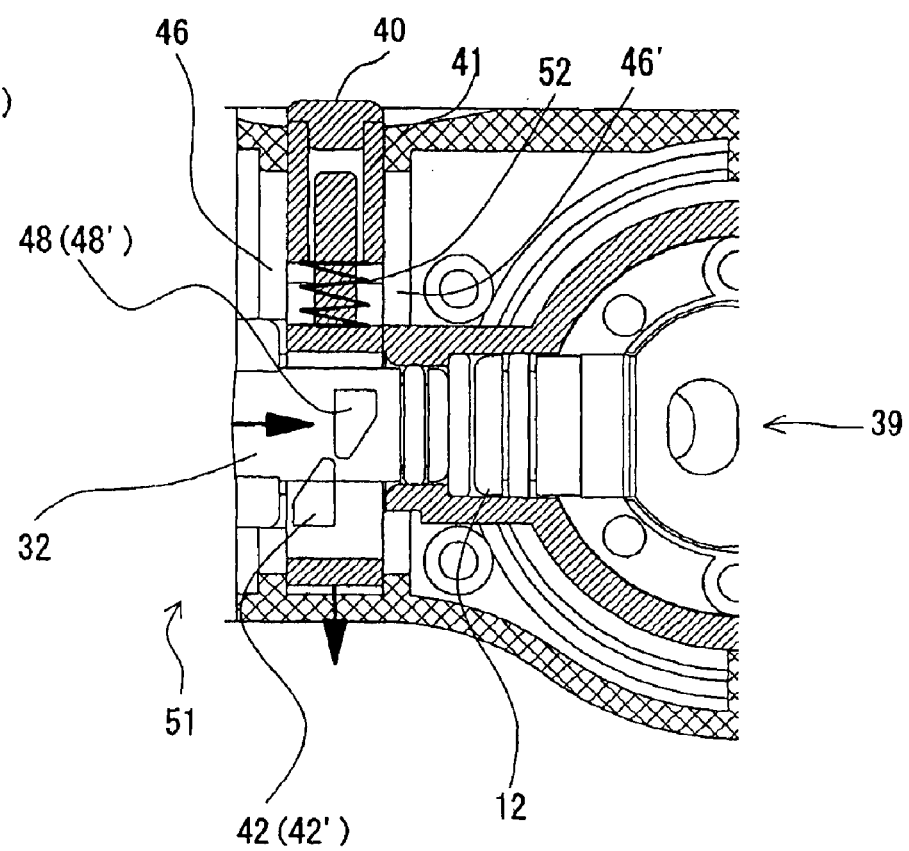
FIG. 10(a) is an explanatory view showing the interior structure of the main body side coupling portion and the filtration portion side coupling portion.
Figure 10B:
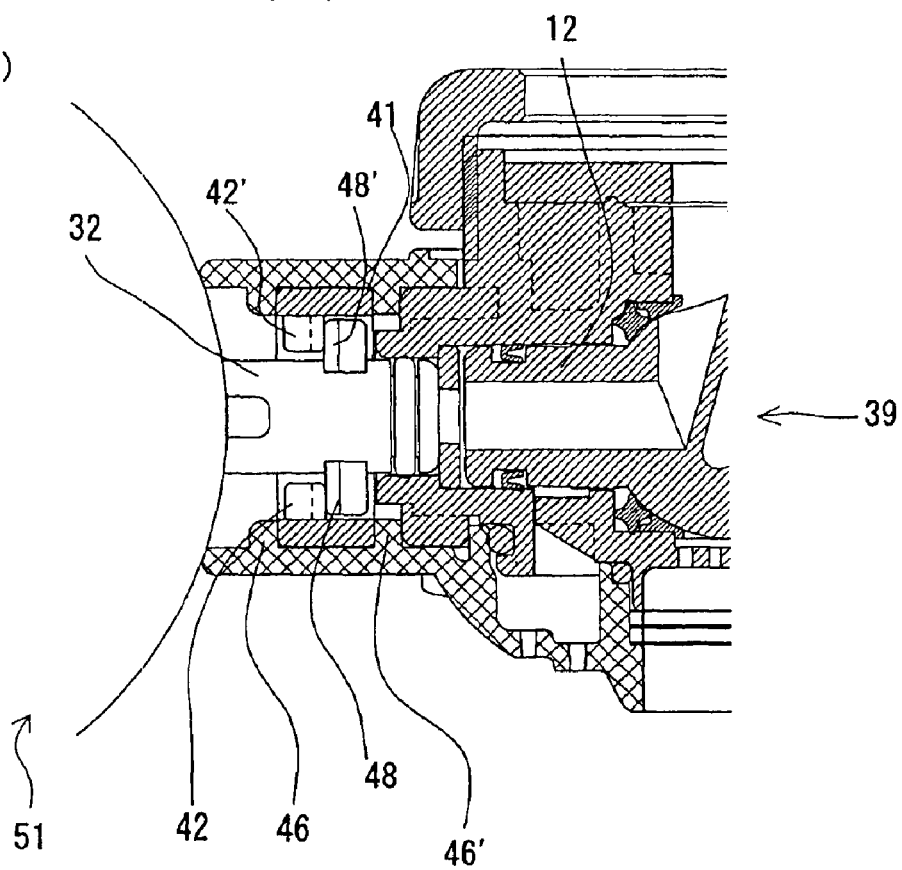
FIG. 10(b) is an explanatory view showing the interior structure of these components when projected onto a front view.

Subsequently, having gone through the conditions shown in FIGS. 9(*a*) and 9(*b*) and FIGS. 10(*a*) and 10(*b*), the slanted surfaces no longer touch with each other as shown in FIG. 11(*a*), and no external pressure exerted from pressing pressure is applied to the stoppers 42 and 42', whereby they are pulled back upward to the initial position by tension of the spring 52. In other words, the stoppers 48 and 48' mounted over the top portions of the stoppers 42 and 42' and have moved to the side of the valve main body 2 with respect to the stoppers 42 and 42', whereby the stoppers 42 and 42' and the stoppers 48 and 48' are stopped at the reversed positions in the axial core direction of the supply inlet 12, that is, in the flowing direction of the raw water, whereupon the connection operation is completed. At this point, the stoppers 42 and 42' and the stoppers 48 and 48' engage with each other at their respective surfaces corresponding to the bases of the substantially trapezoidal surfaces.

Figure 11A:
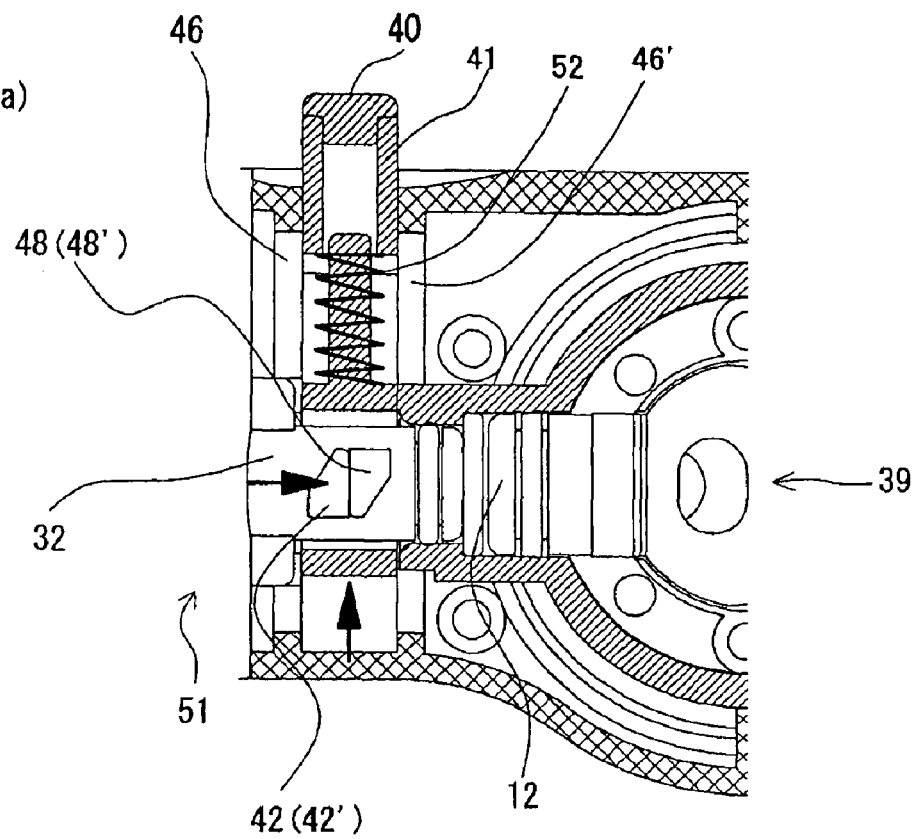
FIG. 11(a) is an explanatory view showing the interior structure of the main body side coupling portion and the filtration portion side coupling portion.
Figure 11B:
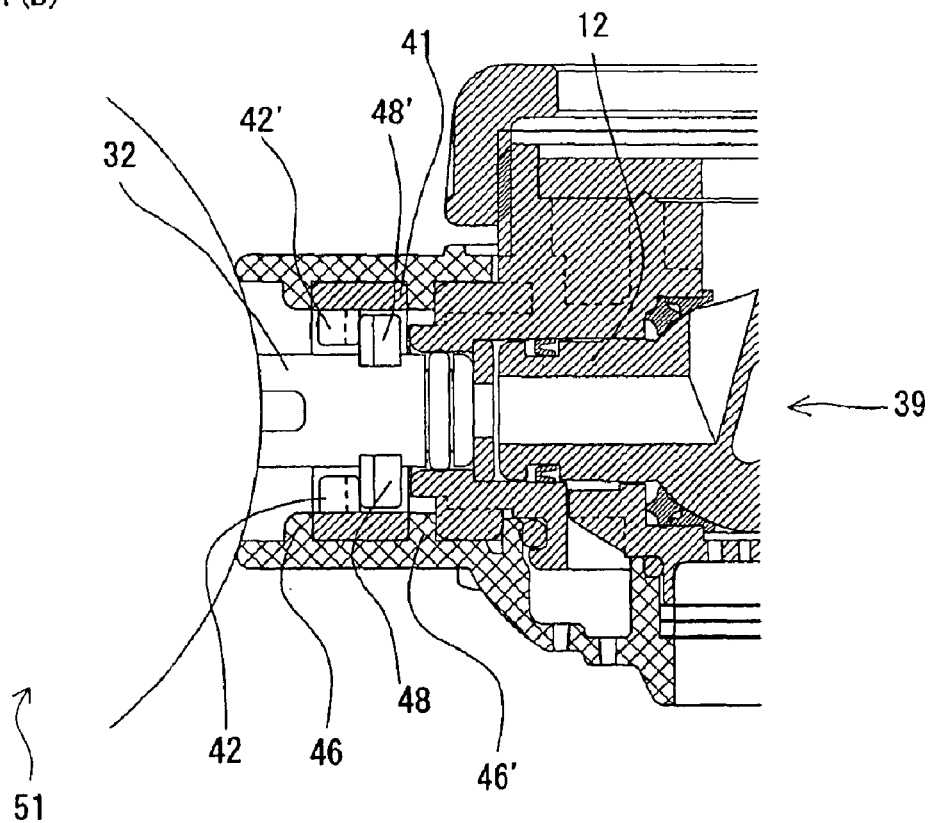
FIG. 11(b) is an explanatory view showing the interior structure of these components when projected onto a front view.
Figure 12:
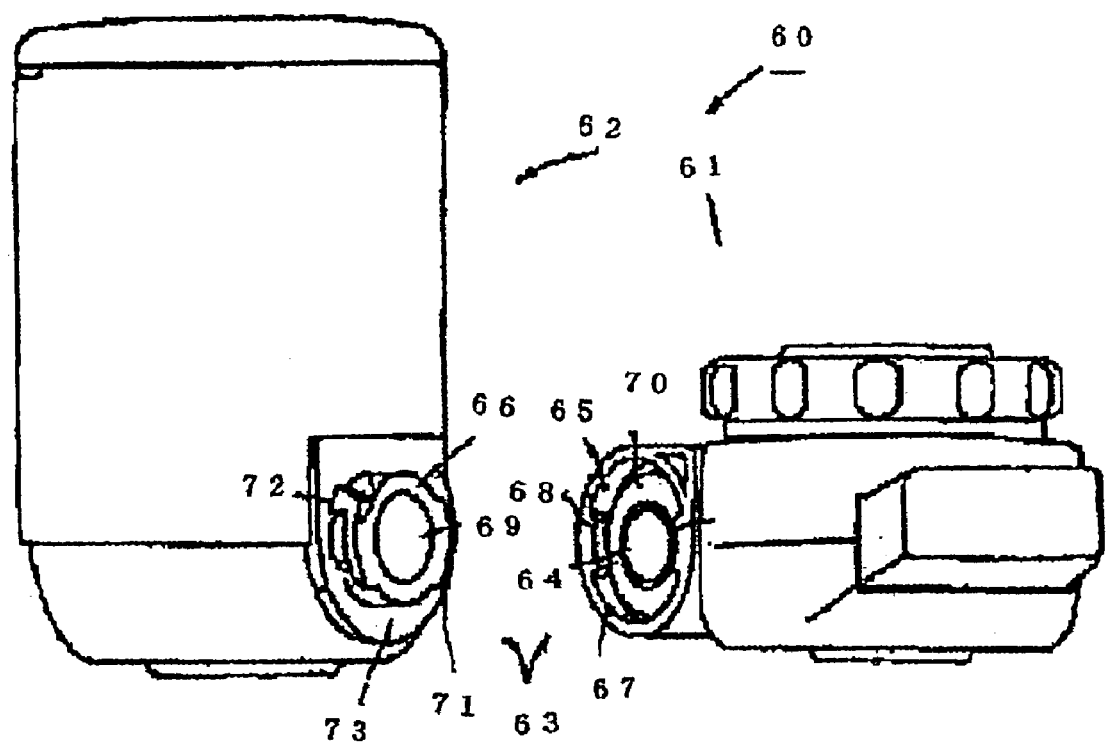
FIG. 12 is an explanatory view showing a coupling mechanism of a conventional water purifier.

Also, in the connection condition shown in FIGS. 11(a) and 11(b), the supply inlet 12 of the main body side coupling portion 39 and the raw water accepting inlet 32 of the filtration portion side coupling portion 51 touch with each other in a stable manner by means of an O-ring or the like provided at the touching portion as needed, which allows raw water to pass through the connection portion of these components in a secure manner without causing leakage of raw water.

Also, in order to disconnect these components in the above connection condition, it is necessary to move the stoppers 42 and 42' downward and the stoppers 48 and 48' upward relatively to each other against tension of the spring 52. Hence, in the above connection condition, the stoppers 42 and 42' and the stoppers 48 and 48' are kept stopped in a stable manner unless the button cover 40 provided at the top portion of the release button 41 is pressed downward to move the stoppers 42 and 42' and the stoppers 48 and 48' relatively to each other.

As a consequence, in case that the user does not press the button cover 40, that is, in the connection condition, even when a water pressure rises sporadically by raw water flowing in from the valve main body 2, it is impractical that a partial pressure of the water pressure is applied at a level as high as to cause the stoppers 42 and 42' and the stoppers 48 and 48' to move relatively to each other in the sliding direction, thereby making it possible to maintain the connection in a stable manner.

In the present embodiment, the spring 52 is used as a resilient body. However, the resilient body is not especially limited as long as it can limit the disconnection operation by pushing the release button 41 along the sliding direction of the stoppers 42 and 42', and the resilient body may be made of metal, synthetic resin, natural resin, and other various kinds of materials. In addition, the resilient body may be provided to the filtration portion side coupling portion 51 when occasion demands.

On the other hand, in the disconnection operation, the user pulls out the filtration portion side coupling portion 51 while pressing the button cover 40 in an inward direction of the main body side coupling portion 39, so that the operation is carried out in a reversed manner with respect to the procedure of the connection operation discussed above, whereby the stopping and stopped condition between the stoppers 48 and 48' and the stoppers 42 and 42' is released, and so is the connection of the main body side coupling portion 39 and the filtration portion side coupling portion 51.

As has been discussed, the stoppers 42 and 42' and the stoppers 48 and 48' are provided so that they are allowed to slide along only in the axial core direction of the supply inlet 12, that is, in one particular direction that intersects substantially at right angles with the flowing direction of raw water passing by the main body side coupling portion 39 in the connection operation and the disconnection operation of the valve main body 2 and the cartridge 5. Thus, the connection is disconnected only when the stoppers 42 and 42' and the stoppers 48 and 48' move relatively to each other in the above-specified one particular direction, and as a result, should a water pressure be applied sporadically when water with a high water pressure flows in, the cartridge 5 will not fall off easily.

Also, according to the above arrangement, the stoppers 42 and 42' move only in the above-specified one particular direction in the connection operation and the disconnection operation, it is possible to connect the cartridge 5 to the valve main body 2 in a single step with ease in a secure manner. In the present embodiment, the stoppers 48 and 48' and the stoppers 42 and 42' are polyhedral pillar-wise protrusions having substantially trapezoidal longitudinal sections as described above. However, the shape of the stopping members is not limited to the foregoing, and the shape may be determined arbitrarily as occasion demands within the scope of the above objects and advantages.

Also, in the above description, the stoppers 42 and 42' are formed so as to protrude from the inner side of the frame 43 of the release button 41 as an integral part thereof. Then, the release button 41 is sandwiched by the outer edge portions 46 and 46' so that it is allowed to slide only in the above-specified one particular direction. Consequently, even when a water pressure is applied in the flowing direction of raw water, the release button 41 is not allowed to move in the flowing direction, and the stopping and stopped condition of the stoppers 42 and 42' and the stoppers 48 and 48' is not released, thereby making it possible to maintain the connection condition in a stable manner.

Figure 5B:
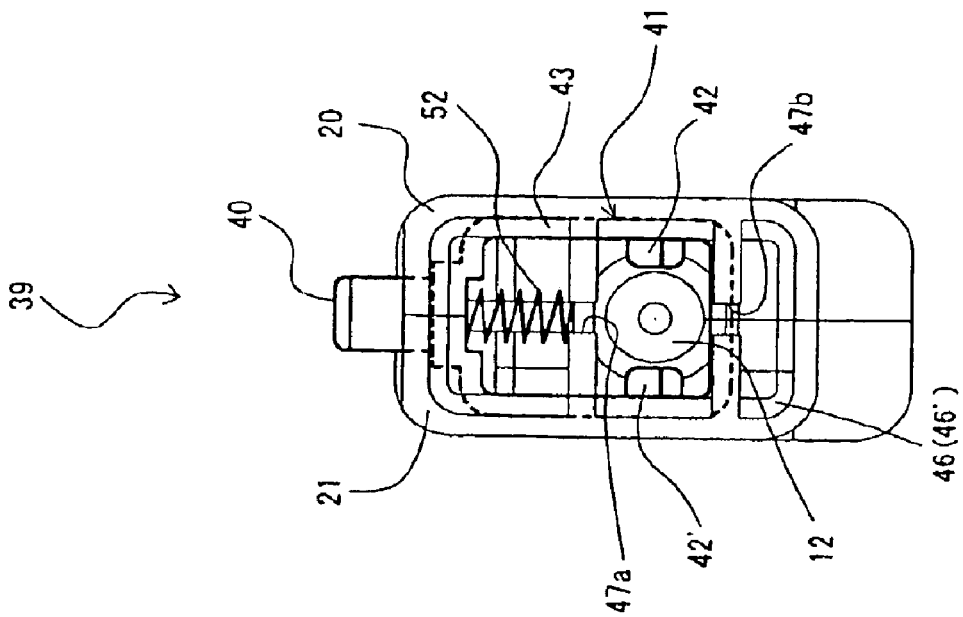
FIG. 5(b) is an explanatory view showing a structure of the main body side coupling portion and a structure of a corresponding filtration portion side coupling portion.

Next, the following description will describe the pair of rotation preventing stoppers 49 and 49' protruding from the vicinity of the attachment portion of the cartridge 5 at the raw water accepting inlet 32. In the connection operation, the rotation preventing stoppers 49 and 49' are respectively fit into stoppers 47a and 47b provided to the main body side coupling portion 39. In other words, as shown in FIG. 5(b), the rotation preventing stoppers 49 and 49' are provided to the positions rotated by 90° around the cylindrical axis of the cylindrical raw water accepting inlet 32 with respect to the stoppers 48 and 48'. In other words, in the connection condition, by fitting the rotation preventing stoppers 49 and 49' respectively into the stoppers 47a and 47b provided to the main body side coupling portion 39, it is possible to prevent the main body side coupling portion 39 or the filtration portion side coupling portion 51 from rotating around the cylindrical axis, that is, around the axial core of the main body side coupling portion 39 (around the flowing direction of raw water) in a secure manner. Consequently, it is possible to prevent a fall-off of the cartridge 5 from the valve main body 2 more effectively when water with a high water pressure flows in.

In the present embodiment, the rotation preventing stoppers 49 and 49' are used. It should be appreciated, however, that the main body side fitting member and the filtration portion side fitting member of the present invention are not especially limited as long as they have an arrangement that can prevent a rotation around the axial core.

As has been discussed, according to the present embodiment, the stopping members touch with each other at their respective slanted surfaces corresponding to the oblique sides of the substantially trapezoidal surfaces, which changes their positional relation. Consequently, the connection operation can be performed smoothly, and moreover, the surfaces of the stopping members corresponding to the bases of their respective substantially trapezoidal surfaces touch with each other in the connection condition (stopping and stopped condition), thereby allowing the stopping members to stop with each other in a secure manner.

In the present embodiment, the main body side stopping members and the filtration portion side stopping members have substantially trapezoidal longitudinal sections. However, the shape of these stopping members is not especially limited, and many other shapes may be adopted as well. For example, the main body side stopping member and the filtration side stopping member may be of a shape provided with slanted surfaces that touch with each other at the beginning of the connection operation like the slanted surfaces corresponding to the oblique sides of the substantially trapezoidal surfaces as described above, and with engaging surfaces that engage the stopping members with each other.

Also, the water purifier of the present embodiment is of a style, in which the main body side stopping member is attached in such a manner that it is allowed to slide only in the above-specified one particular direction in the main body side coupling portion. However, the filtration portion side stopping members may be attached in such a manner that it is allowed to slide only in one direction in the filtration portion side coupling portion.

Next, the following description will describe, with reference to the accompanying drawings, another embodiment of the present invention.

Figure 13:
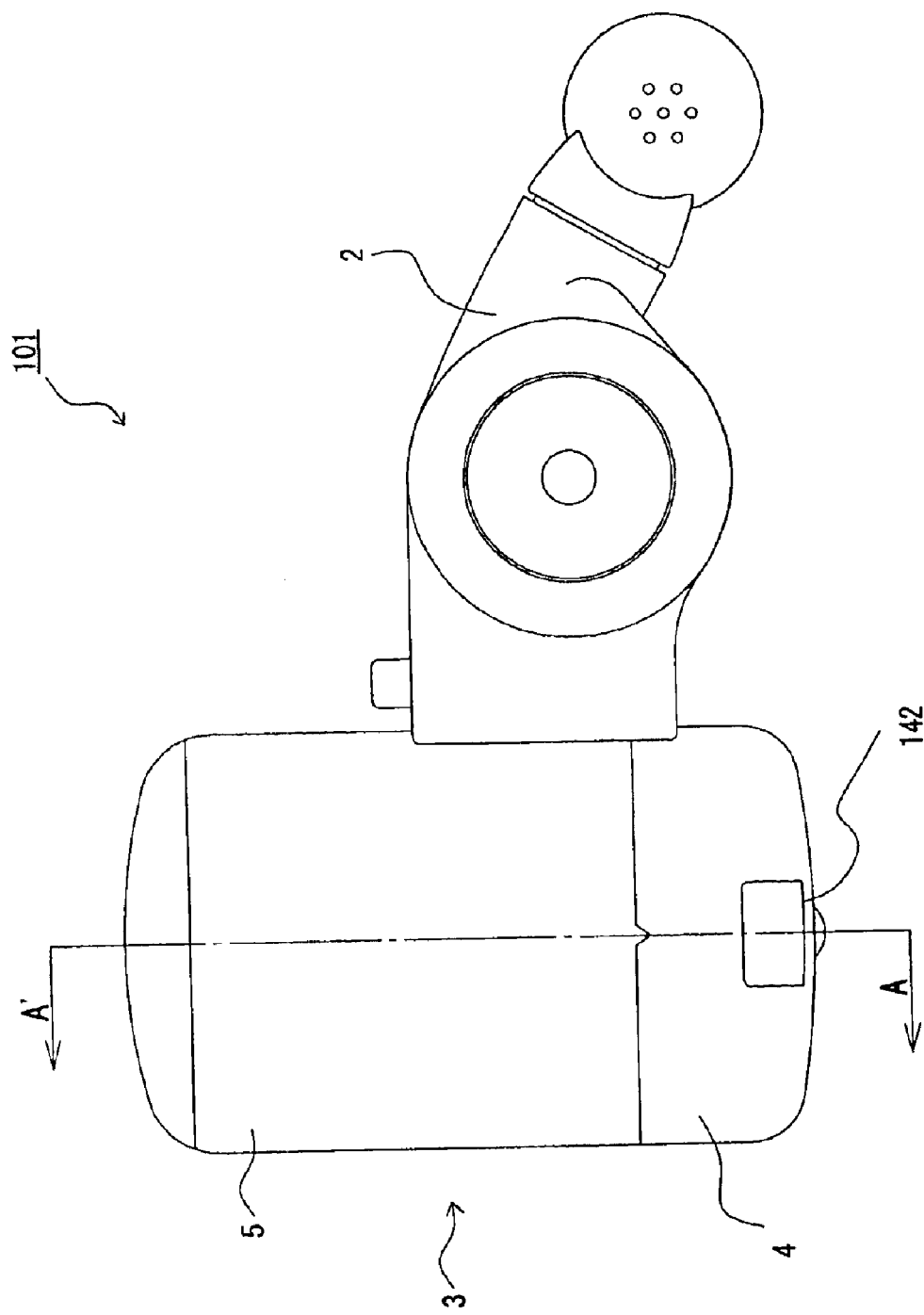
FIG. 13 is a plan view schematically showing an arrangement of a water purifier according to one embodiment of the present invention.
Figure 14:
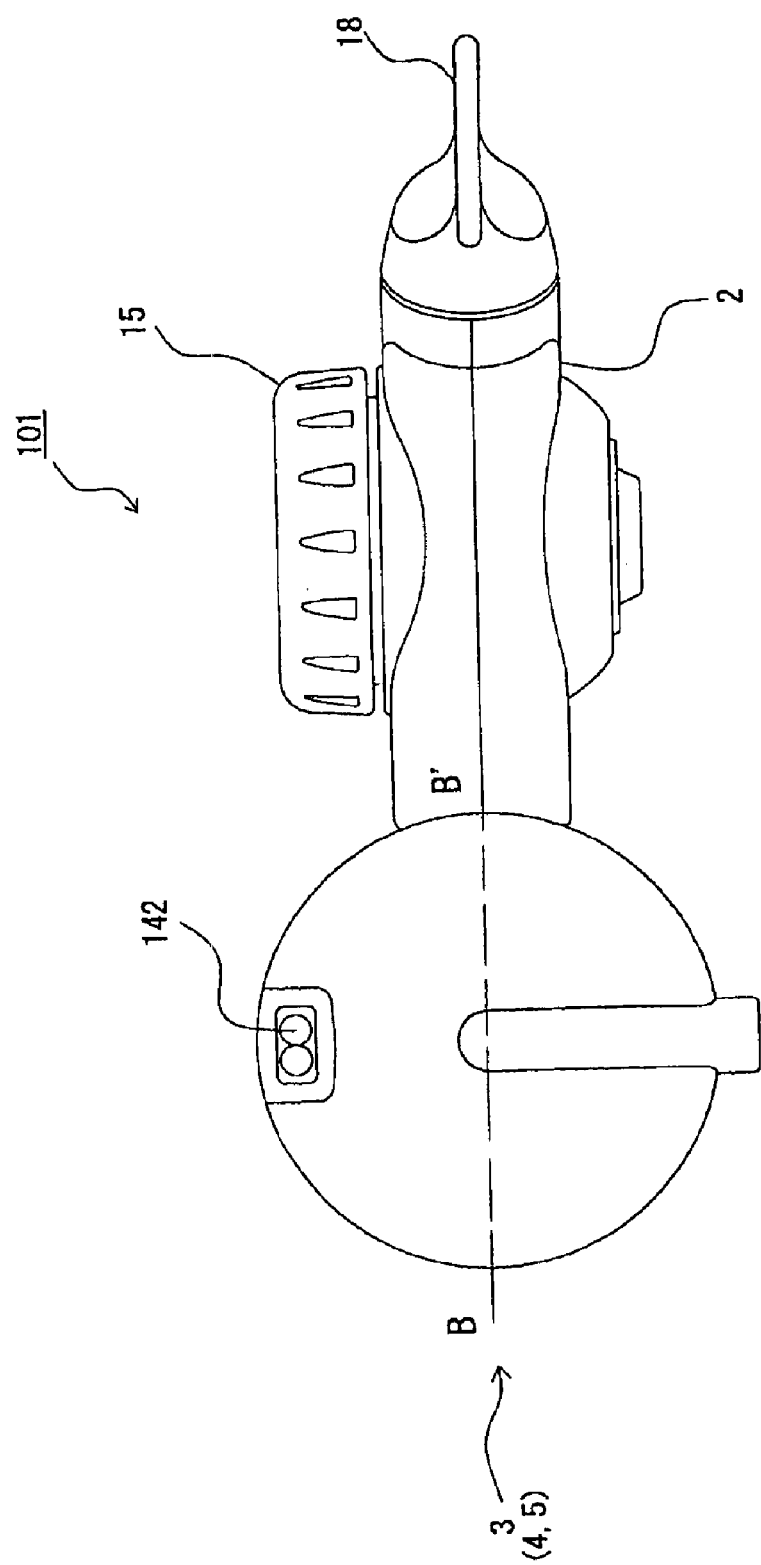
FIG. 14 is a front view schematically showing the arrangement of the water purifier according to one embodiment of the present invention.
Figure 15A:
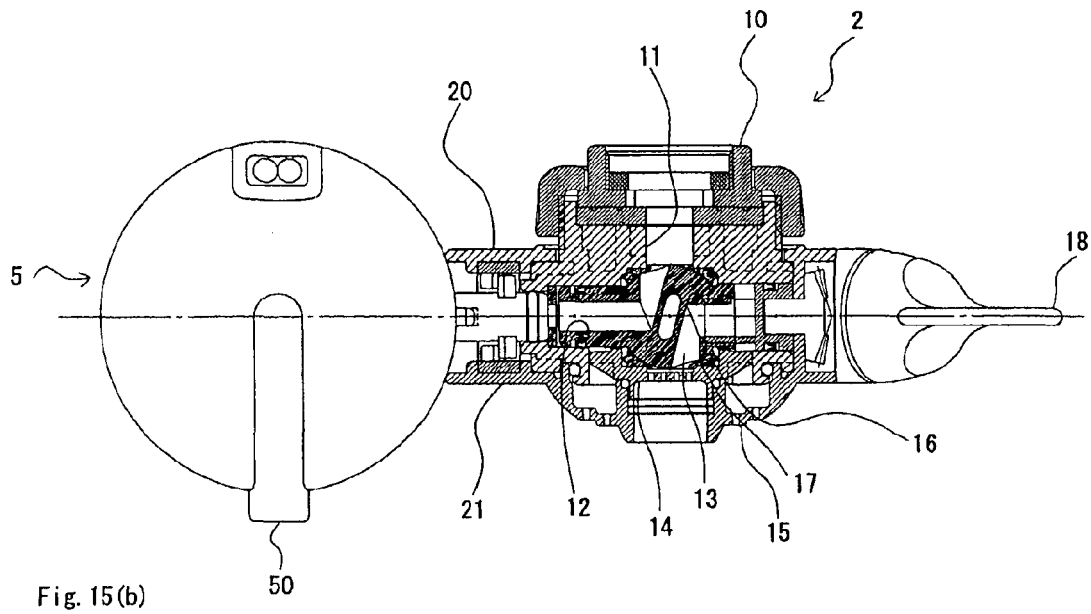
FIG. 15(a) is an explanatory view replacing the front view in FIG. 14 with a longitudinal section for a valve main body 2 alone.
Figure 15B:
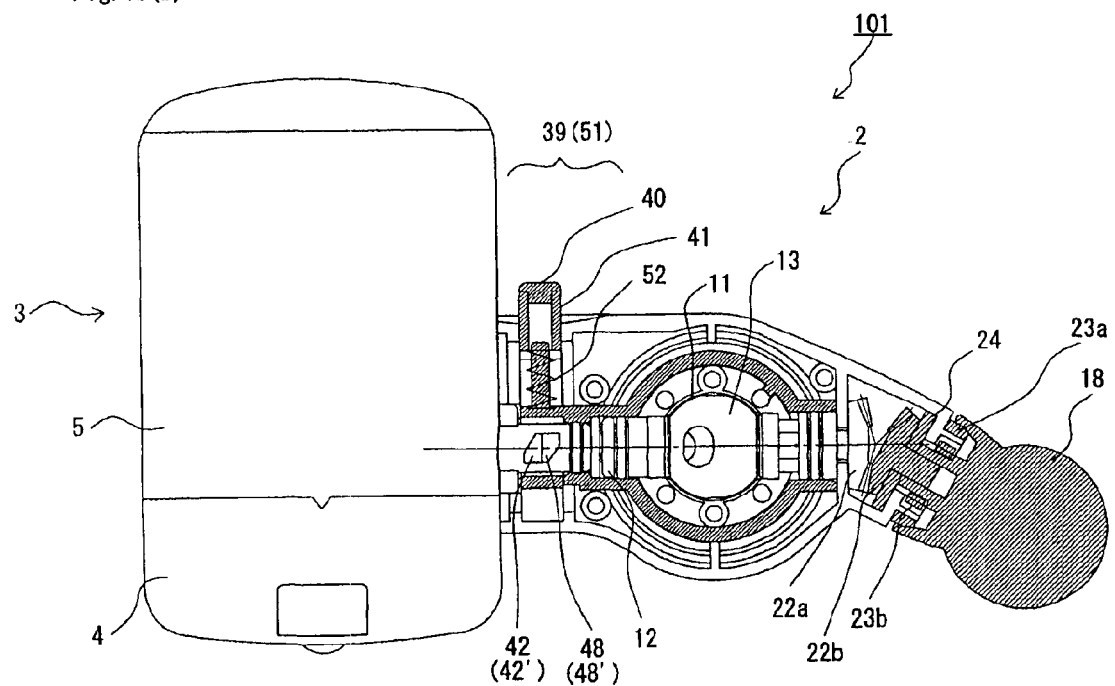
FIG. 15(b) is an explanatory view replacing the plan view in FIG. 13 with a cross section for the valve main body 2 alone.

FIG. 13 is a plan view schematically showing an arrangement of a water purifier according to the present embodiment. FIG. 14 is a front view schematically showing the arrangement of the water purifier according to the present embodiment. FIG. 15(a) is an explanatory view replacing the front view in FIG. 14 with a longitudinal section for a valve main body 2 alone. FIG. 15(b) is a view replacing the plan view in FIG. 13 with a cross section for valve main body 2 alone.

As shown in FIG. 13, a water purifier 101 according to the present embodiment is composed of a valve main body 2 (water purifier main body) coupled to an unillustrated tap water faucet, and a filtration portion 3 (water purifier filtration portion), connected to the valve main body 2 in a detachable and attachable manner, for holding a filtration material that filters raw water flown from the valve main body 2. Further, the filtration portion 3 is composed of a cartridge 5 (drum body) for holding the filtration material and an indicator portion 4 (display portion) connected to the cartridge 5 in a detachable and attachable manner.

As shown in FIG. 15(a), the valve main body 2 is coupled to the unillustrated tap water faucet by means of an adapter 10. The valve main body 2 is provided with: an opening portion 11 formed at the connection portion with the adapter 10 for accepting raw water; an outlet 14 for directly releasing raw water flown into the valve main body 2 from the opening portion 11 without being filtered; a shower outlet 15 for releasing raw water flown from the opening portion 11 through minute pores without being filtered; an opening portion (a supply inlet 12) for supplying the cartridge 5 with raw water accepted from the opening portion 11; a 3-way switching valve 13 for introducing raw water accepted from the opening portion 11 into a desired channel; and a handle 18 (holding portion) for enabling the user to switch the channels in association with the 3-way switching valve 13.

In the present embodiment, the 3-way switching valve 13 is used for selectively switching channels in three directions. It should be appreciated, however, that a multi-direction valve for selectively introducing water to four or more channels may be used as well.

Figure 16A:
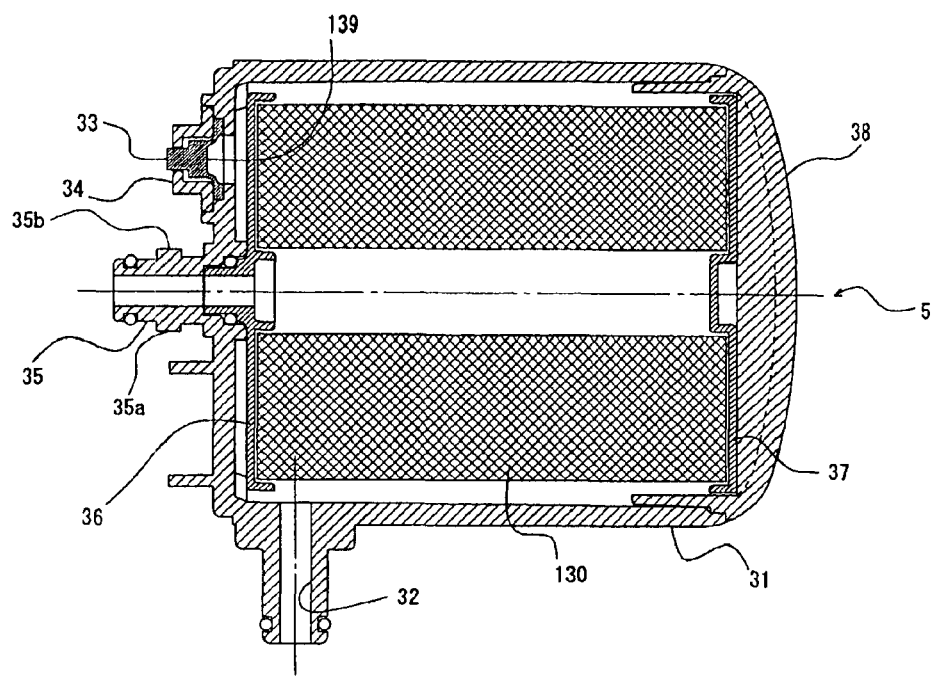
FIG. 16(a) is a cross section of a cartridge 5 taken on line B–B' in FIG. 14.
Figure 16B:
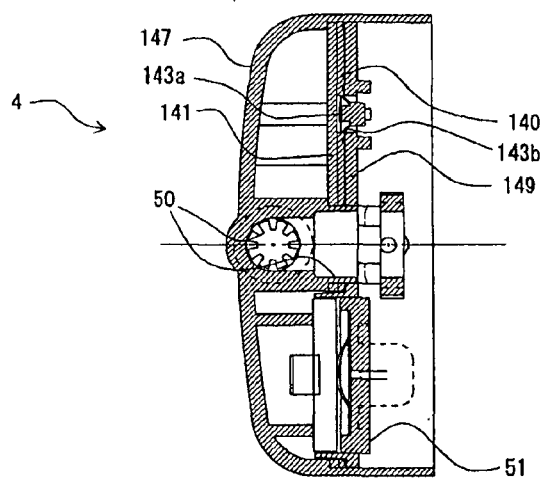
FIG. 16(b) is a cross section of an indicator portion 4 taken on line B–B' in FIG. 14.
Figure 16C:
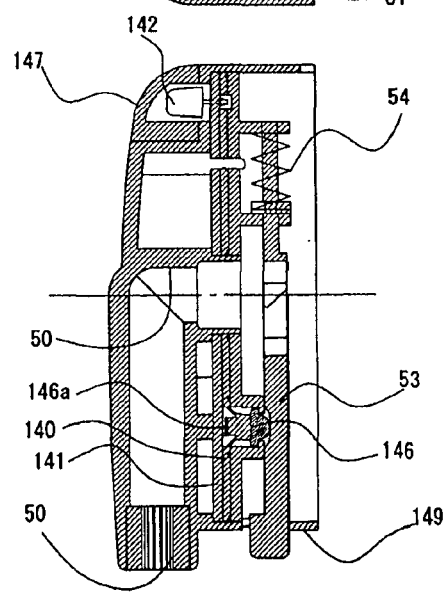
FIG. 16(c) is a cross section of the indicator portion 4 taken on line A–A' in FIG. 13 when viewed from the valve main body 2.

FIG. 16(a) is a cross section of the cartridge 5 taken on line B–B' in FIG. 14. FIG. 16(b) is a cross section of the indicator portion 4 taken on line B–B' in FIG. 14. FIG. 16(c) is a cross section of the indicator portion 4 taken on line A–A' in FIG. 13 when viewed from the valve main body 2.

The cartridge 5 shown in FIG. 16(a) is provided with a carbon block 130 as a filtration material and a container 31 for holding the same. The container 31 is of substantially a cylindrical shape, and a cover 38 is fit in at the cylindrical top portion by means of welding. The container 31 is provided with a raw water accepting inlet 32 on the side surface, which will be connected to the opening portion (the supply inlet 12) of the valve main body 2. Also, at the cylindrical bottom surface, the container 31 is provided with a filtrate supply inlet 35 (fluid supply inlet, supporting portion) for releasing filtrate from the carbon block 130 to the outside. The indicator portion 4 (described below) as shown in FIG. 16(b) is connected to the filtrate supply inlet 35 in a detachable and attachable manner.

Further, the inner opening of the filtrate supply inlet 35 is arranged so as to axially support a bottom surface protrusion portion of the carbon block 130 as the filtration material, and to introduce filtrate flown in from a cylindrical hollow portion of the carbon block 130 to a purified water outlet 50. In order to prevent a water leak, O-rings (rings of rubber packing) are provided to the axially supported bottom surface protrusion portion of the carbon block 130, and to the contact between the filtrate supply inlet 35 and the purified water outlet 50.

Raw water flown in from the raw water accepting inlet 32 passes by a minute space between the inner wall surface of the container 31 and the cylindrical carbon block 130, and is filtered by the carbon block 130 as it permeates through the carbon block 130 across the side surface thereof, after which it passes by the hollow portion of the carbon block 130 and is introduced to the filtrate supply inlet 35 and supplied to the outside through the purified water outlet 50 of the indicator portion 4.

The carbon block 130 is a block of solidified activated carbon powder with a cylindrical hollow inside. The cylindrical side surface is exposed to raw water accepted from the valve main body 2, and the both end surfaces are respectively covered with disk lids 36 and 37.

The lid 37 entirely covers the top end surface including the cylindrical hollow portion, and is arranged so that filtrate passing through the filtration material and flowing into the hollow portion will not leak from the top portion of the hollow portion. On the other hand, the lid 36 is a toroidal disk having an opening for the hollow portion at the center thereof, and is arranged so as to introduce filtrate flown into the hollow portion to the filtrate supply inlet 35. In other words, as has been described, the carbon block 130 is axially supported as a part of the opening portion of the cylindrical hollow portion is inserted into the filtrate supply inlet 35.

In the present embodiment, the carbon block 130 is a cylinder with a hollow inside. It should be appreciated, however, that the shape of the filtration material is not limited to the foregoing, and it may be a cylinder without a hollow portion as occasion demands. Also, instead of the arrangement to cover the end surfaces with the lids 36 and 37, a non-woven fabric may be laminated at the top and bottom as pre-filters. The carbon block 130 of the present embodiment is of a single layer structure made of a block of solidified active carbon powder. It should be appreciated, however, that the arrangement of the filtration material is not limited to the foregoing, and it may be of a double-layer structure, in which the cylindrical side surface is covered with a porous pre-filter and the interior thereof is made of the filtration material, such as activated carbon.

Next, the following description will describe a mechanism of the indicator portion 4 of the water purifier 101 according to the present embodiment. As shown in FIG. 14 and FIGS. 16(a) and 16(b), the indicator portion 4 of the present embodiment is composed of: a concave portion 139

(pressure sensing portion) provided at the cylindrical bottom surface of the container 31; a sensor packing 33 (pressure sensing portion) provided to the tip end portion of the concave portion 139; a switch packing 140 (resilient thin plate) for conveying a water pressure conveyed through the sensor packing 33 further to a circuit board 141; the circuit board 141; a lighting portion 142 provided to the circuit board 141; an indicator plate 149 serving as a partition wall between a stream of water and the switch packing 140 and circuit board 141; and an indicator cover 147 for housing the foregoing.

In other words, in the indicator portion 4, the indicator plate 149, the switch packing 140, and the circuit board 141 are deposited in this order adjacent to the concave portion 139 and the sensor packing 33, and are housed in the indicator cover 147. Also, the indicator cover 147 is provide with the purified water outlet 50 for releasing purified water by making a channel that communicates with the filtrate supply inlet 35 of the container 31.

Initially, an explanation will be given to the concave portion 139 and the sensor packing 33 provided to the cylindrical bottom surface of the container 31 to serve as the pressure sensing portion. As shown in FIG. 16(a), according to the cartridge 5 of the present embodiment, the circular concave portion 139 is provided to the cylindrical bottom surface of the container 31 at an adequate spot. The sensor packing 33 made of silicone rubber is provided to the tip end surface of the concave portion 139 at the side of the indicator portion 4. The sensor packing 33 is formed as an integral part of the concave portion 139, and is made of silicone rubber to form a convex shape in the tip end surface at the side of the indicator portion 4. In other words, the convex tip end portion of the sensor packing 33 extends and contracts outward and inward due to is resilience by a water pressure applied to the concave portion 139. Hence, during filtration in the filtration portion 3, that is, while an internal pressure at or above a predetermined level is generated by a stream of water at the concave portion 139, the protruding tip end portion moves toward the indicator portion 4 (toward the display portion).

In the present embodiment, the mobility of the convex portion during filtration, that is, while an internal pressure of the cartridge 5 is rising, is set to approximately 1 mm.

Also, a sensor supporting portion 34 for limiting excessive extension of the sensor packing 33 by a water pressure is provided to surround the sensor packing 33. The sensor supporting portion 34 not only makes it possible to set the mobility of the sensor packing 33 adequately in accordance with the structure of the indicator portion 4, but also makes it possible to prevent damages to materials of the sensor packing 33 caused by excessive extension or expansion, or malfunction of the sensor packing 33 by a water pressure. The material of the sensor packing 33 may be other than silicone rubber, and is not especially limited as long as it is a resilient body for allowing the protruding tip end portion to move for a predetermined distance by a water pressure.

Next, the following description will describe the switch packing 140. As shown in FIG. 16(b), the switch packing 140 is housed in the indicator cover 147 as being deposited between the circuit board 141 and the indicator plate 149. Each of the circuit board 141, the switch packing 140, and the indicator plate 149 is a disk, and is provided with a concentric opening portion substantially as large as the purified water outlet 50 at the center, so that each disk is axially supported by the purified water outlet 50 that is inserted into these opening portions.

Figure 17A:
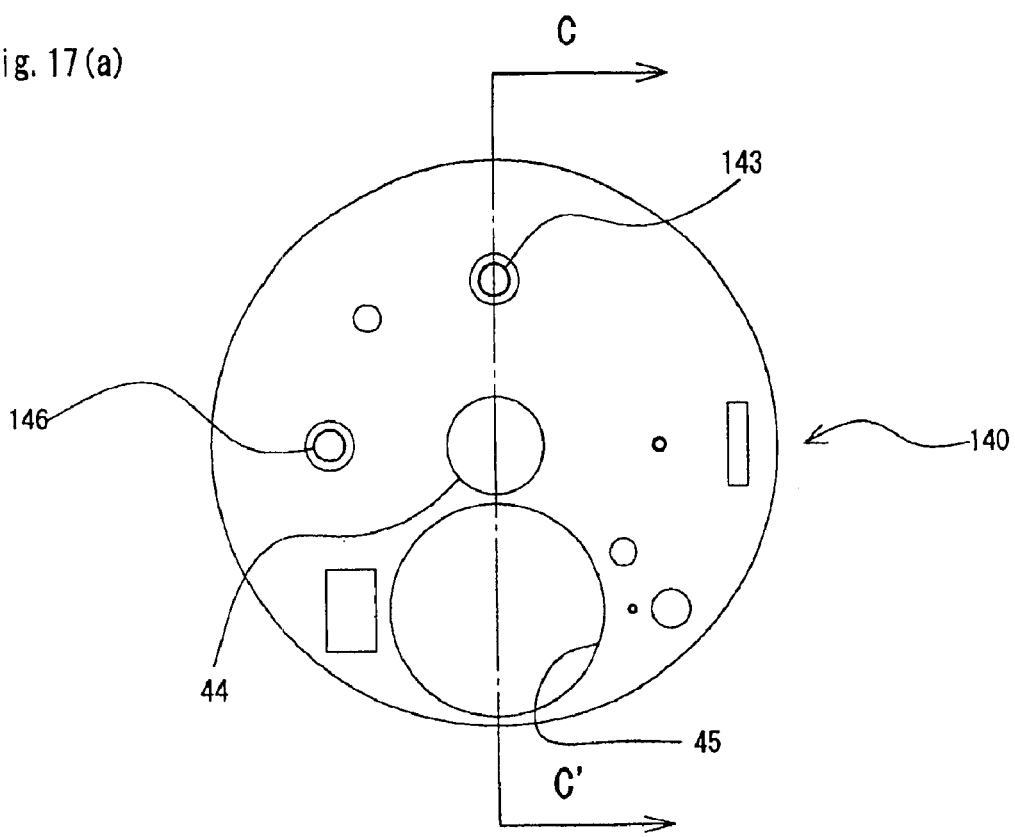
FIG. 17(a) is a plan view of a switch packing 140.
Figure 17B:
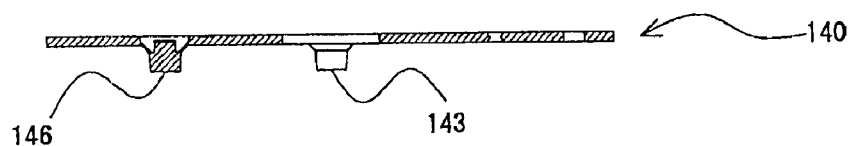
FIG. 17(b) is a front view of the switch packing 140.

FIG. 17(a) is a plan view of the switch packing 140 and FIG. 17(b) is a front view of the switch packing 140.

As shown in FIG. 17(a), the switch packing 140 is made of a disk of thin plate made of silicone rubber. Also, the switch packing 140 is provided with an opening portion 44 axially supported by the purified water outlet 50, a battery-use opening portion 45, and a sensor switch 143 (first pressing portion) and a reset switch 146 (second pressing portion) both applied with a conductive material on their respective surfaces at the side of the circuit board 141.

In the present embodiment, the first pressing portion is formed by applying the conductive material on the surface at the side of the circuit board 141. However, means of introducing the conductive material is not limited to the application on the surface, and a separate member having the dispersed conductive material may be inserted when occasion demands.

Figure 17C:
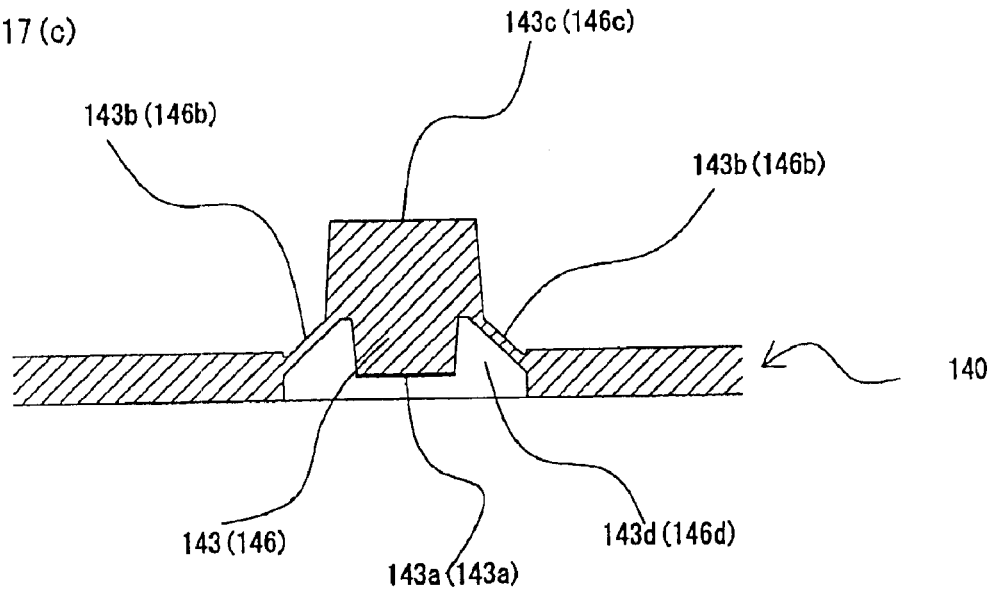
FIG. 17(c) is a partially enlarged view of the switch packing 140.

The sensor switch 143 and the reset switch 146 are made into one body of a convex shape protruding toward the cartridge 5. FIG. 17(c) is an enlarged view of the sensor switch 143 out of the cross section taken on the line C–C' in FIG. 17(a). As shown in the drawing, the sensor switch 143 is arranged in such a manner that a tip end protrusion portion 143c (first pressing portion) is supported by arm portions 143b (resilient supporting portion) so as to protrude toward the cartridge 5. Also, a conductive member 143a (first conductive member) is a conductive material applied on the end surface at the side of the circuit board 141 (the lower side in FIG. 17(c)). Also, as shown in FIG. 17(c), while filtration is not performed at the cartridge 5, that is, while no water pressure is applied, the conductive member 143a stands still at the position slightly closer to the cartridge 5 (the upper side in FIG. 17(c)) from the surface of the packing 140 at the side of the circuit board 141. Consequently, while the filtration is not performed, the first conductive member will not be brought into contact with an input portion (described below) of the circuit board 141, and an electric circuit does not accumulate time. Also, as is in the same manner as discussed above, a conductive member 146a serving as a second conductive member applied on the reset switch 146, which will be described below, is provided on the switch packing 140 so as to be supported by arm portions 146b (resilient supporting portion) in a positional relation as shown in FIG. 17(c).

As has been discussed, the sensor switch 143 is attached to the indicator portion 4 so that the tip end protrusion portion 143c faces the cartridge 5. As shown in FIG. 16(c), when the switch packing 140 is inserted into the indicator portion 4, the two arm portions 143b bend by a pressure generated when the circuit board 141 and the indicator plate 149 are deposited, which causes the tip end protrusion portion 143c to move toward the carbon block 130 and stand still at the moved position. Hence, in the absence of an internal pressure by a stream of water flown through the cartridge 5, the tip end protrusion portion 143c is never brought into contact with the circuit board 141 and a predetermined space is secured in between, so that the circuit board 141 does not accumulate time. An operation during the filtration will be described below.

Also, on the circumference where the connection portions of the arm portions 143b and 146b and the switch packing 140 are formed, a groove portion 143d and a groove portion 146d are respectively provided along the circumference. This allows a reciprocating motion by the first pressing portion and the second pressing portion more smoothly.

Figure 18:
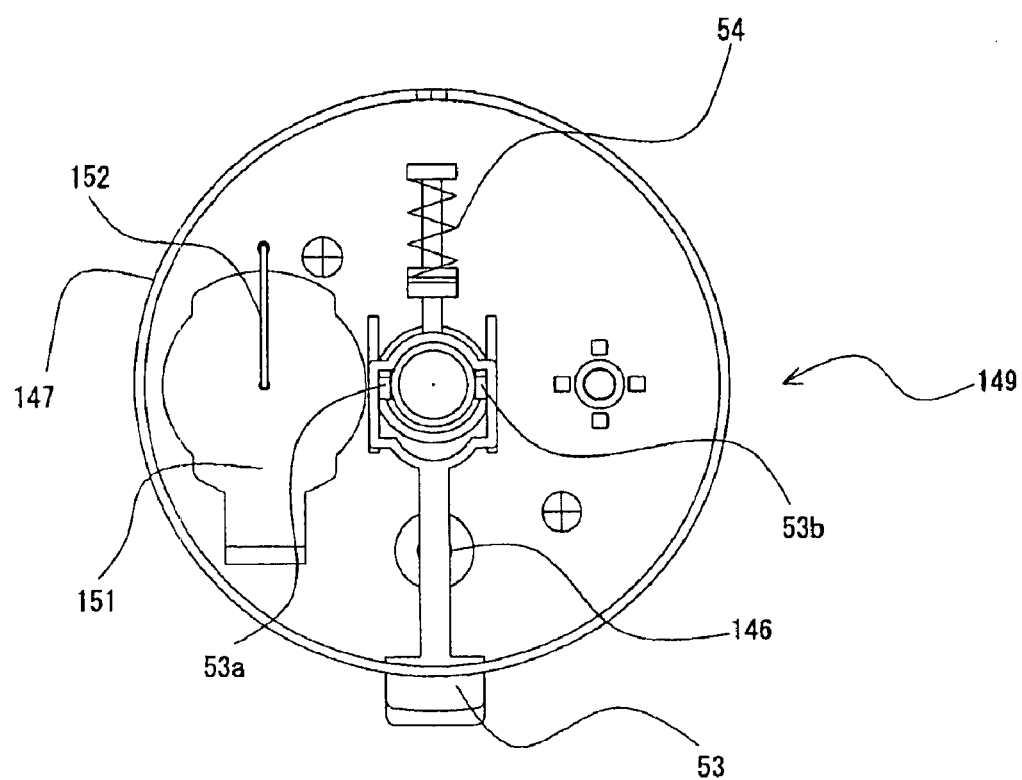
FIG. 18 is an explanatory view showing an indicator plate attached to a display portion according to one embodiment of the present invention when viewed from the cartridge 5.

Next, the following description will describe the indicator plate 149. FIG. 18 is an explanatory view of the indicator plate 149 attached to the indicator portion 4 when viewed from the cartridge 5. As shown in FIG. 18, the indicator plate 149 has a disc of resin substrate, on which provided are: a battery cap 151 for fixing a button battery connected to the circuit board 141 and for isolating the circuit board 141 and the like from a stream of water; a lead wire 152 for coupling the battery cap 151 to the substrate to serve as a hinge portion when opening and closing the battery cap 151 and for also serving as a conductor; a switch slider 53 (filtration material removing means) for detaching the cartridge 5 from the indicator portion 4 at the time of replacement of the cartridge 5; and a spring 54 (filtration material removing means) attached to the switch slider 53.

As shown in FIG. 18, the switch slider 53 is made of resin and has an arm-wise shape, and an opening portion that matches with the shape of the purified water outlet 50 is made as an integral part at or around the center of the arm. Also, the switch slider 53 is supported in such a manner that it is allowed to slide along the center line of the disk of the indicator plate 149 while one end of its longitudinal direction is kept pushed by the spring 54. Further, the outside tip end portion of the switch slider 53 protrudes toward the side surface of the indicator 147, so that, at the time of replacement of the cartridge 5, when the outside tip end portion is pressed by the user, it is pressed inward against tension of the spring 54.

As has been discussed, it is arranged in such a manner that the opening portion of the switch slider 53 moves toward the spring 54 when the switch slider 53 is pressed inward, whereupon the filtrate supply inlet 35 of the cartridge 5 inserted through the purified water outlet 50 is readily detached.

On the other hand, when a new cartridge 5 is attached, the cartridge 5 and the indicator portion 4 are readily connected to each other fixedly by inserting the filtrate supply inlet 35 of the new cartridge 5 into the purified water outlet 50 so that they engage with each other. At this point, because the engaged portion is stabilized by tension of the spring 54, the cartridge 5 will not fall off easily by a sporadic increase in water pressure or the like. In other words, a pair of stoppers 35a and 35b attached to the both sides of the outer surface of the filtrate supply inlet 35 as shown in FIG. 16(a), and stoppers 53a and 53b attached to the opening portion of the switch slider 53 engage with each other, which maintains the attached condition of the cartridge 5 and the indicator portion 4 in a stable manner.

Also, a part of the sliding surface of the switch slider 53 is made into a concave shape that matches with the shape of the top portion of the reset switch 146. While the cartridge 5 is attached to the filtration portion 3, the switch slider 53 is at a position where the portion made into the concave shape covers the top portion of the reset switch 146.

On the contrary, in case that the user presses the outside tip end portion of the switch slider 53 protruding from the side surface of the indicator cover 147 at the time of replacement of the cartridge 5, the original sliding surface of the switch slider 53 touches the top portion of the reset switch 146. Consequently, while the outside tip end portion is pressed, the reset switch 146 is pressed by the sliding surface, and the conductive member 146a serving as the second conductive member applied on the reset switch 146 moves toward the circuit board 141 and is brought into contact with an input portion 162 (second input portion) of the circuit board 141. Consequently, the accumulation operation by the electric circuit is terminated and the accumulated time is erased. In the present embodiment, as shown in FIG. 16(c), the top portion of the reset switch 146, that is, a portion of the reset switch 146 that touches the sliding surface of the switch slider 53 is provided with a cap made of synthetic resin. By providing such a cap, it is possible to reduce friction between the switch slider 53 and the reset switch 146, which can further improve the ease of operation at the time of replacement of the cartridge 5.

According the above arrangement, the accumulated time is erased without fail at each replacement of the cartridge 5, and therefore, it is possible to start an accumulation of filtration time of a newly replaced cartridge 5 from 0.

Figure 19:
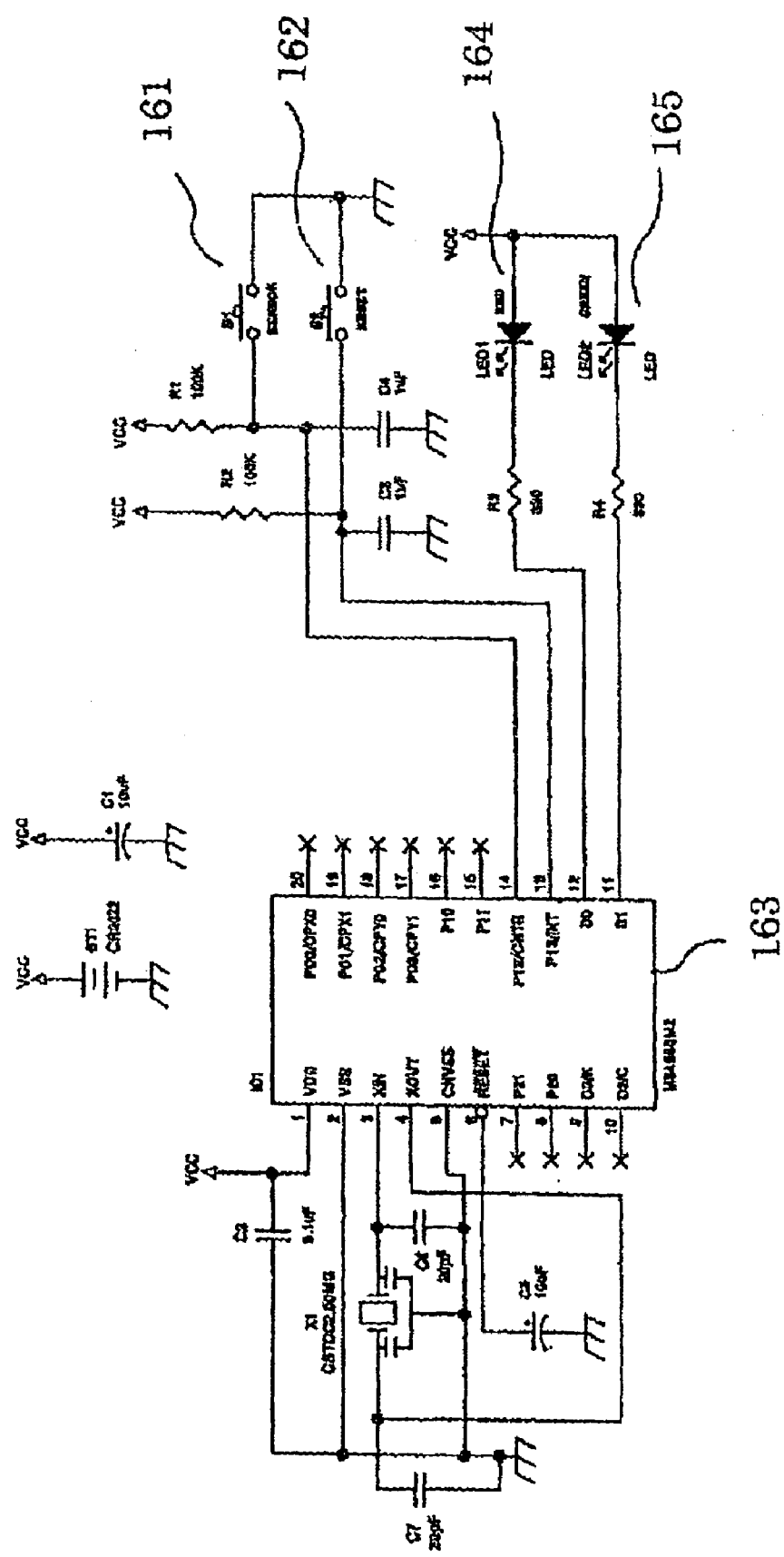
FIG. 19 is an explanatory view showing an electric circuit mounted on a circuit board.

The following description will describe the circuit board 141. FIG. 19 is an explanatory view showing the electric circuit mounted on the circuit board 141. As shown in the drawing, the electric circuit is provided with the input portion 161 (first input portion) for the sensor switch 143, the input portion 162 (second input portion) for the reset switch 146, a microprocessor 163, an output portion 164 (first output portion) for a red LED (Light Emitting Diode), an output portion 165 for a green LED, an unillustrated battery (3 volts) serving as a power source, etc. In other words, the input portion 161 is provided at a position where the conductive member 143a of the sensor switch 143 is brought into contact with the same when an internal pressure is generated in the cartridge 5. Likewise, the input portion 162 is provided at a position where the conducing member 146a applied at the tip end portion of the reset switch 146 at the side of the circuit board 141 is brought into contact with the same when the cartridge 5 is replaced.

Next, the following description will describe an operation of the indicator portion 4.

The indicator portion 4 of the present embodiment has a mechanism for determining the service life of the carbon block 130, that is, the time for replacement of the cartridge 5, from the accumulated time calculated with the circuit board 141, and for notifying the user with the determination result. In other words, the indicator portion 4 does not directly measure a total volume of water which has been flown in the cartridge 5, but calculates an accumulation time from a total volume of water treatable by the cartridge 5 and a predetermined flow rate intrinsic to the water purifier, and notifies the user of the reach to the total treatable volume when the accumulation time reaches a value equivalent to the treatable total volume.

To be more specific, in the present embodiment, 0.7 GPM (gallon/minute) is given as a flow quantity (flow rate) per unit time uniquely set to the water purifier 101. On the other hand, as to a capacity of the carbon block 130 used in the cartridge 5, 100 gallons is given as a total treatable volume of water from which the water purifier 101 can remove removal target substances by means of filtration. Hence, in theory, the replacement time of the cartridge 5 is approximately 144 minutes when it is converted into accumulation time. In other words, the present embodiment has a mechanism, with which the circuit board 141 calculates the accumulation time, and when the accumulation time reaches 144 minutes, a notice is given to the user by the indicator portion 4.

Initially, when raw water flows in the cartridge 5 from the raw water accepting inlet 32, raw water fills in a minute space between the side surface of the carbon block 130 and the inner wall of the container 31, and reaches the concave portion 139. Hence, raw water flows inside the cartridge 5, and an internal pressure at or above the predetermined level is generated at the concave portion 139 during filtration. Once the internal pressure is generated at the concave portion 139, the sensor packing 33 starts to extend by the internal pressure, and the tip end portion thereof presses the tip end protrusion portion 143c of the sensor switch 143 on the switch packing 140.

Consequently, the conductive member 143a of the sensor switch 143 is brought into contact with the input portion 161 on the circuit board 141, which switches ON the sensor switch 143, whereupon time accumulation starts. In short, the circuit on the circuit board 141 is closed (sensor switch ON condition). The electric circuit accumulates time while the circuit is in the closed condition. At this point, the LED displayed at the lighting portion 142 is set so as to perform the operation as follows. That is, when the accumulation time is in a range from 0 to 120 minutes (an accumulation volume: 0 to 84 gallons), the green LED at the lighting portion 142 connected to the output portion 165 lights ON for the first one second when raw water begins to flow, thereby notifying the user that the carbon block 130 is within the service life.

Then, when the accumulation time is in a range from 120 to 145 minutes (an accumulation volume: 84 to 101.5 gallons) under the sensor switch ON condition, the red LED connected to the output portion 164 lights ON for the first one second when raw water begins to flow, thereby warning that the expiration of the service life of the carbon block 130 (cartridge 5) is near.

Then, when the accumulation time is in a range from 145 to 160 minutes (an accumulation volume: 101.5 to 112 gallons), the red LED repetitively lights ON and OFF every second under the sensor switch ON condition, thereby indicating and giving a warning to the user that the service life of the carbon block 130 has expired. Further, when an accumulation time reaches 160 minutes or more (an accumulation volume: 112 gallons or more), the LED shows nothing under the sensor switch ON condition.

Next, the following description will describe a reset operation at the time of replacement of the cartridge 5.

At the time of replacement of the cartridge 5, the fixing of the cartridge 5 is released by pressing the outside tip end portion of the switch slider 53 by the side surface of the indicator cover 147 in an inward direction of the indicator cover 147. In other words, when the switch slider 53 is pressed, the concave portion of the sliding surface slides inward, whereby a pressure is applied to the reset switch 146 by the flat portion of the sliding surface of the switch slider 53. Hence, the reset switch 146 is pressed toward the circuit board 141. Consequently, the conductive material applied on the tip end protrusion portion of the reset switch 146 is brought into contact with the input portion 162 of the electric circuit, whereupon the circuit is closed (reset switch ON condition).

At this point, the electric circuit is set in such a manner that the accumulation time calculated up to that point is reset to 0. Also, the green LED of the lighting portion 142 connected to the output portion 165 lights ON for the first one second under the reset switch ON condition, thereby indicating that the accumulated time has been reset.

The water purifier main body of the present invention may be arranged in such a manner that: the main body side stopping member is provided on a supporting member housed in the main body side coupling portion; and the supporting member is sandwiched by a pair of outer edge portions provided to an inner wall of the main body side coupling portion to prevent the supporting member from moving in a flowing direction of the raw water passing by the main body side coupling portion in such a manner that the supporting member is allowed to slide in the above-specified one direction.

According to the above arrangement, by sandwiching the supporting member between the pair of the outer edge portions, it is possible to achieve a mechanism that allows the main body side stopping member to move only in one direction that is substantially perpendicular to a flowing direction of water passing by the main body side coupling portion in a simple and secure manner. Also, because the supporting member is sandwiched in such manner that it is allowed to slide, by moving the supporting member as needed, it is possible to perform the connection operation and the disconnection operation smoothly by using the stopping and stopped condition. The shape of the stopping members is, for example, a frame-wise shape formed along the inner wall of the main body side coupling portion.

The water purifier main body of the present invention may be arranged in such a manner that the supporting member is provided with a resilient body for pushing the supporting member when sliding in the above-specified one direction.

According to the above arrangement, the supporting member is provided with the resilient body. Hence, even if a water pressure rises sporadically, the sliding of the main body side stopping member in a direction to release the stopping and stopped condition is controlled by tension of the resilient body, so that the connection is not readily disconnected. Also, tension of the resilient body enables the user to perform the connection operation and the disconnection operation more smoothly.

The water purifier main body of the present invention may be arranged in such a manner that: the main body side stopping member is a pillar-wise protrusion formed from a prism having a substantially trapezoidal surface as a bottom surface, the substantially trapezoidal surface protruding in an inward direction of the main body side coupling portion, so that a top side and a base side thereof are in parallel with the above-specified one direction and an oblique side thereof is positioned at a side of the water purifier filtration portion; and the main body side stopping member is stopped by the filtration portion side stopping member formed from a prism, which is substantially identical with the main body side stopping member in shape and protrudes toward the water purifier filtration portion in a positional relation such that, at a beginning of the connection operation, the main body side stopping member and the filtration portion side stopping member touch with each other at their respective slanted surfaces each corresponding to the oblique side of the substantially trapezoidal surface.

According to the above arrangement, each of the main body side stopping member and the filtration portion side stopping member is formed from a prism having a substantially trapezoidal surface as the bottom surface, and these stopping members are formed to protrude in the positional relations as discussed above. Hence, at the beginning of the connection operation, these stopping members touch with each other at their respective slanted surfaces each corresponding to the oblique side. Consequently, it is possible to further improve the ease of operation in the connection operation and the disconnection operation when the main body side stopping member slides only in the above-specified one direction.

The water purifier main body of the present invention may be arranged in such a manner that the main body side coupling portion fits in a filtration portion side fitting member provided to the water purifier filtration portion, and is provided with a main body side fitting member for preventing the main body side coupling portion from rotating around an axial core.

According to the above arrangement, the main body side fitting member prevents the rotation around the axial core in a secure manner. Hence, even when a water pressure is generated sporadically in the filter portion side coupling portion and the main body side coupling portion, the filtration portion side stopping member and the main body side stopping member will not shift, thereby making it possible to prevent a fall-off of the filtration portion in a more secure manner.

A water purifier filtration portion of the present invention may be arranged in such a manner so as to include: a raw water accepting inlet for accepting raw water from a water purifier main body; a purified water outlet for releasing purified water to an outside; and a filtration portion side coupling portion that couples to the water purifier main body at the raw water accepting inlet in a detachable and attachable manner, wherein the filtration portion side coupling portion is provided with a filtration portion side stopping member for coupling the water purifier filtration portion to the water purifier main body by stopping and being stopped by a main body side stopping member provided to the water purifier main body, and wherein the water purifier filtration portion is coupled to the water purifier main body as described above by the filtration portion side stopping member in a detachable and attachable manner.

A water purifier filtration portion of the present invention may be arranged in such a manner so as to include: a raw water accepting inlet for accepting raw water from a water purifier main body; a purified water outlet for releasing purified water to an outside; and a filtration portion side coupling portion that couples to the water purifier main body at the raw water accepting inlet in a detachable and attachable manner, wherein the filtration portion side coupling portion is provided with a filtration portion side stopping member for coupling the water purifier filtration portion to the water purifier main body by stopping and being stopped by a main body side stopping member provided to the water purifier main body, and wherein the filtration portion side stopping member is provided in such a manner that the filtration portion side stopping member is allowed to move only in one direction that intersects substantially at right angles with an axial core direction of the filtration portion side coupling portion in a connection operation and a disconnection operation of the water purifier filtration portion and the water purifier main body.

According to the above arrangements, the filtration portion side coupling portion is provided with the filtration portion side stopping member for coupling the water purifier filtration portion to the water purifier main body by stopping and being stopped by the main body side stopping member provided to the water purifier main body. Hence, it is possible to connect the cartridge to the water purifier main body in a single step with ease in a secure manner. Also, the filtration portion side stopping member is provided in such a manner that the filtration portion side stopping member is allowed to move only in one direction that intersects substantially at right angles with the axial core direction of the filtration portion side coupling portion in the connection operation and the disconnection operation. Hence, even when a load is applied to the main body side stopping member or the filtration portion side stopping member by a sporadic change in water pressure, the connection will not be disconnected unless a partial pressure that causes the main body side stopping member to move in the above-specified one direction is applied, which prevents the main body side stopping member from being detached easily. Consequently, it is possible to provide a water purifier filtration portion equipped with a connection mechanism, with which the water purifier-filtration portion does not fall off easily even when water with a high water pressure flows in.

The water purifier filtration portion of the present invention may be arranged in such a manner that: the filtration portion side stopping member is a pillar-wise protrusion formed from a prism having a substantially trapezoidal surface as a bottom surface, the substantially trapezoidal surface protruding outward at the raw water accepting inlet, so that a top side and a base side thereof are in parallel with the above-specified one direction and an oblique side thereof is positioned at a side of the water purifier main body; and the filtration portion side stopping member is stopped by the main body side stopping member, which is substantially identical with the filtration portion side stopping member in shape and protrudes toward the water purifier main body in a positional relation such that, at a beginning of the connection operation, the main body side stopping member and the filtration portion side stopping member touch with each other at their respective slanted surfaces each corresponding to the oblique side of the substantially trapezoidal surface.

According to the above arrangement, each of the main body side stopping member and the filtration portion side stopping member is formed from a pillar-wise protrusion having a substantially trapezoidal surface as the bottom surface, and these stopping members are formed to protrude in the positional relations as discussed above. Consequently, the ease of operation in the connection operation and the disconnection operation can be further improved when the main body side stopping member slides only in the above-specified one direction.

In order to solve the above problems, the water purifier filtration portion of the present invention may be arranged in such a manner that the filtration portion side coupling portion fits in a main body side fitting member provided to the water purifier main body, and is provided with a filtration portion side fitting member for preventing the filtration portion side coupling portion from rotating around an axial core.

According to the above arrangement, the filtration portion side fitting member prevents the rotation around the axial core in a secure manner. Hence, even when a water pressure is generated sporadically in the filter portion side coupling portion and the main body side coupling portion, the filtration portion side stopping member and the main body side stopping member will not shift, thereby making it possible to prevent a fall-off of the filtration portion in a more secure manner.

A water purifier of the present invention may be arranged in such a manner so as to include: the water purifier main body as discussed above; and a water purifier filtration portion coupled to the water purifier main body in a detachable and attachable manner.

A water purifier of the present invention may be arranged in such a manner so as to include: the water purifier filtration portion as discussed above; and a water purifier main body coupled to the water purifier filtration portion in a detachable and attachable manner.

According to the above arrangements, it is possible to provide a water purifier provided with a connection mechanism, with which the water purifier filtration portion and the water purifier main body can be connected in a single step with ease in a secure manner, and the filtration portion does not fall off easily even when water with a high water pressure flows in.

The water purifier filtration portion of the present invention arranged as above may be further arranged in such a manner that: the first conductive member is provided on a resilient thin plate separated from the drum; and a protruding surface of the protrusion portion, the first conductive member, and the first input portion are placed sequentially in order of description on a substantially straight line along a normal direction of a wall surface of the drum, on where the pressure sensing portion is formed.

According to the above arrangement, the first conductive member is provided on the resilient thin plate separated from the drum. Hence, the conductive member itself does not have to be formed from a large conductive material, which can simplify the structure and save a space of the conductive material significantly, thereby making it possible to save an overall space easily. Also, the protruding surface of the protrusion portion, the first conductive member, and the first input portion are placed sequentially on a substantially straight line along the normal direction of the wall surface. Hence, when the pressure sensing portion senses a change in internal pressure, it can convey the change to the first input portion accurately.

The water purifier filtration portion of the present invention may be arranged in such a manner that: the first conductive member on the resilient thin plate is provided to a bottom surface at a side of the electric circuit of a protruding first pressing portion provided at a position so as to be pressed by the protruding surface of the protrusion portion; and the first conductive member is supported by being formed as an integral part of the resilient thin plate in such a manner that a reciprocating motion is allowed in association with a pressing operation and a pressed condition releasing operation by the protrusion portion.

According to the above arrangement, the first conductive member is provided at the predetermined position in the first pressing portion of the protrusion portion. Hence, it is possible to simplify the structure of the display portion and to save an overall space. Also, by allowing a reciprocating motion of the first conductive member in association with a pressing operation and a pressed condition releasing operation by the protrusion portion, it is possible to convey a change in internal pressure sensed by the pressure sensing portion to the first input portion accurately.

The water purifier filtration portion of the present invention may be arranged in such a manner that: the electric circuit is provided with a second input portion for erasing the accumulated time counted by the electric circuit when the electric circuit is switched ON; and the display portion is provided with a second conductive member for switching ON the electric circuit when brought into contact with the second input portion in sync with separation of the drum by a detaching and attaching mechanism.

According to the above arrangement, the display portion erases the accumulated time counted by the electric circuit in sync with separation of the drum by the detaching and attaching mechanism. Hence, it is possible to reset the accumulated time simultaneously with the replacement of the cartridge.

The water purifier filtration portion of the present invention may be arranged in such a manner that: the second conductive member is provided to a bottom surface at a side of the electric circuit of a second pressing portion provided on the resilient thin plate; and the detaching and attaching mechanism presses the second pressing portion toward the electric circuit in association with a separating operation of the display portion and the drum.

According to the above arrangement, the second conductive member is provided at the predetermined position in the second pressing portion and presses the second pressing portion toward the electric circuit in association with a separating operation. Hence, it is possible to simplify the structure of the display portion and save an overall space.

The water purifier filtration portion of the present invention may be arranged in such manner that: the first pressing portion and the second pressing portion are made of substantially cylindrical columns formed as an integral part of the resilient thin plate; and the first pressing portion and the second pressing portion are supported at side surfaces of their respective columns and by a resilient supporting portion of a substantially truncated cone formed as an integral part of the resilient thin plate to have a little smaller plate thickness in comparison with a surface of the resilient thin plate.

The water purifier filtration portion of the present invention may be arranged in such a manner that a groove portion is provided along a circumference forming a connection portion of the resilient supporting portion and the surface of the resilient thin plate.

According to the above arrangements, the first pressing portion and the second pressing portion are supported by the resilient supporting portion. Hence, each pressing portion makes a reciprocating motion in a secure manner in response to a change in internal pressure in the drum or the attachment and detachment of the cartridge, thereby making it possible to convey the change in internal pressure and the attachment and detachment to each input portion accurately. In case that the groove portion is provided along the circumference, the first pressing portion and the second pressing portion can make a reciprocating motion more smoothly.

In order to solve the above problems, the water purifier filtration portion of the present invention may be arranged in such a manner that at least one of the resilient body, the protrusion portion, the resilient thin plate, the first pressing portion, and the second pressing portion is made of silicone rubber.

According to the above arrangement, by using silicone rubber, a water leak can be prevented in a secure manner between the drum and the display portion, in particular, between the drum and the electric circuit, and at the same time, a change in internal pressure or the like can be conveyed more accurately.

A water purifier of the present invention may be arranged in such a manner so as to include the water purifier filtration portion described above.

According to the above arrangement, the water purifier is equipped with the water purifier filtration portion as described above. Hence, it is possible to provide a water purifier filtration portion capable of notifying the user of its service life accurately, reducing the number of components, and saving a space in the vicinity of the tap water faucet, and a water purifier including the same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water purifier main body, including:
   a raw water inlet;
   a raw water supply inlet; and a main body side coupling portion that couples to a water purifier filtration portion for filtering raw water flowing in from said raw water inlet at said raw water supply inlet in a detachable and attachable manner, wherein said main body side coupling portion is provided with a main body side stopping member for coupling said water purifier filtration portion to said water purifier main body by stopping and being stopped by a filtration portion side stopping member provided to said water purifier filtration portion, and wherein said main body side stopping member is provided to said main body side coupling portion in such a manner that said main body side stopping member is allowed to move relatively to said filtration portion side stopping member in one direction that intersects substantially at right angles with an axial core direction of said main body side coupling portion in a connection operation and a disconnection operation of said water purifier filtration portion and said water purifier main body.

2. The water purifier main body according to claim 1, wherein:

said main body side stopping member is provided on a supporting member housed in said main body side coupling portion; and said supporting member is sandwiched by a pair of outer edge portions provided to an inner wall of said main body side coupling portion to prevent said supporting member from moving in a flowing direction of the raw water passing by said main body side coupling portion in such a manner that said supporting member is allowed to slide in said one direction.

3. The water purifier main body according to claim 2, wherein said supporting member is provided with a resilient body for pushing said supporting member when sliding in said one direction.

4. The water purifier main body according to claim 2, wherein:

said main body side stopping member is a pillar-wise protrusion formed from a prism having a substantially trapezoidal surface as a bottom surface, said substantially trapezoidal surface protruding in an inward direction of said main body side coupling portion, so that a top side and a base side thereof are in parallel with said one direction and an oblique side thereof is positioned at a side of said water purifier filtration portion; and said main body side stopping member is stopped by said filtration portion side stopping member formed from a prism, which is substantially identical with said main body side stopping member in shape and protrudes toward said water purifier filtration portion in a positional relation such that, at a beginning of the connection operation, said main body side stopping member and said filtration portion side stopping member touch with each other at their respective slanted surfaces each corresponding to the oblique side of said substantially trapezoidal surface.

5. The water purifier main body according to claim 1, wherein said main body side coupling portion is provided with a main body side fitting member and said water purifier filtration portion is provided with a filtration portion side fitting member for fitting into the main body side fitting member such that the main body side coupling portion is prevented from rotating around the axial core.

6. A water purifier filtration portion, including:

a raw water accepting inlet for accepting raw water from a water purifier main body;

a purified water outlet for releasing purified water to an outside; and a filtration portion side coupling portion that couples to said water purifier main body at said raw water accepting inlet in a detachable and attachable manner, wherein said filtration portion side coupling portion is provided with a filtration portion side stopping member for coupling said water purifier filtration portion to said water purifier main body by stopping and being stopped by a main body side stopping member provided to said water purifier main body, and wherein said water purifier filtration portion is coupled to the water purifier main body by said filtration portion side stopping member in a detachable and attachable manner, wherein said water purifier main body includes said main body side coupling portion provided with the main body side stopping member for coupling said water purifier filtration portion to said water purifier main body by stopping and being stopped by the filtration portion side stopping member provided to said water purifier filtration portion, and wherein said main body side stopping member is provided to said main body side coupling portion in such a manner that said main body side stopping member is allowed to move relatively to said filtration portion side stopping member in one direction that intersects substantially at right angles with an axial core direction of said main body side coupling portion in a connection operation and a disconnection operation of said water purifier filtration portion and said water purifier main body.

7. A water purifier filtration portion, including:

a raw water accepting inlet for accepting raw water from a water purifier main body;

a purified water outlet for releasing purified water to an outside; and a filtration portion side coupling portion that couples to said water purifier main body at said raw water accepting inlet in a detachable and attachable manner, wherein said filtration portion side coupling portion is provided with a filtration portion side stopping member for coupling said water purifier filtration portion to said water purifier main body by stopping and being stopped by a main body side stopping member provided to said water purifier main body, and wherein said filtration portion side stopping member is provided in such a manner that said main body side stopping member is allowed to move relatively to said filtration portion side stopping member in one direction that intersects substantially at right angles with an axial core direction of said filtration portion side coupling portion in a connection operation and a disconnection operation of said water purifier filtration portion and said water purifier main body.

8. The water purifier filtration portion according to claim 7, wherein:

said filtration portion side stopping member is a pillar-wise protrusion formed from a prism having a substantially trapezoidal surface as a bottom surface, said substantially trapezoidal surface protruding outward at said raw water accepting inlet, so that a top side and a base side thereof are in parallel with said one direction and an oblique side thereof is positioned at a side of said water purifier main body; and said filtration portion side stopping member is stopped by said main body side stopping member, which is substantially identical with said filtration portion side stopping member in shape and protrudes toward said water purifier main body in a positional relation such that, at a beginning of the connection operation, said main body side stopping member and said filtration portion side stopping member touch with each other at their respective slanted surfaces each corresponding to the oblique side of said substantially trapezoidal surface.

9. The water purifier filtration portion according to claim 7, wherein said water purifier main body is provided with a main body side fitting member and said filtration portion side coupling portion is provided with a filtration portion side fitting member for fitting into the main body side fitting member such that said filtration portion side coupling portion is prevented from rotating around the axial core.

10. A water purifier, including:

a water purifier main body; and a water purifier filtration portion coupled to said water purifier main body in a detachable and attachable manner, wherein said water purifier main body is provided with a raw water inlet;

a raw water supply inlet; and a main body side coupling portion that couples to the water purifier filtration portion for filtering raw water flowing in from said raw water inlet at said raw water supply inlet in a detachable and attachable manner, wherein said main body side coupling portion is provided with a main body side stopping member for coupling said water purifier filtration portion to said water purifier main body by stopping and being stopped by a filtration portion side stopping member provided to said water purifier filtration portion, and wherein said main body side stopping member is provided to said main body side coupling portion in such a manner that said main body side stopping member is allowed to move relatively to said filtration portion side stopping member in one direction that intersects substantially at right angles with an axial core direction of said main body side coupling portion in a connection operation and a disconnection operation of said water purifier filtration portion and said water purifier main body.

11. A water purifier, including:

a water purifier filtration portion; and a water purifier main body coupled to said water purifier filtration portion in a detachable and attachable manner, wherein said water purifier filtration portion includes:

a raw water accepting inlet for accepting raw water from the water purifier main body;

a purified water outlet for releasing purified water to an outside; and a filtration portion side coupling portion that couples to said water purifier main body at said raw water accepting inlet in a detachable and attachable manner, wherein said filtration portion side coupling portion is provided with a filtration portion side stopping member for coupling said water purifier filtration portion to said water purifier main body by stopping and being stopped by a main body side stopping member provided to said water purifier main body, and wherein said filtration portion side stopping member is provided in such a manner that and said main body side stopping member is allowed to move relatively to said filtration portion side stopping member to in one direction that intersects substantially at right angles with an axial core direction of said filtration portion side coupling portion in a connection operation and a disconnection operation of said water purifier filtration portion and said water purifier main body.

* * * * *